United States Patent [19]

Bartholic et al.

[11] Patent Number: 4,818,373

[45] Date of Patent: Apr. 4, 1989

[54] PROCESS FOR UPGRADING TARS AND BITUMEN

[75] Inventors: David B. Bartholic, Watchung; William J. Reagan, Englishtown, both of N.J.

[73] Assignee: Engelhard Corporation, Menlo Park, N.J.

[21] Appl. No.: 795,581

[22] Filed: Nov. 6, 1985

Related U.S. Application Data

[63] Continuation-in-part of Ser. No. 662,666, Oct. 19, 1984, abandoned, Ser. No. 682,962, Dec. 18, 1984, abandoned, and Ser. No. 719,939, Apr. 4, 1985, abandoned.

[51] Int. Cl.$^4$ .............................................. C10G 17/00
[52] U.S. Cl. ................................... 208/252; 208/177; 208/253; 208/127; 208/248; 208/91; 208/153; 208/299; 502/27
[58] Field of Search .................. 208/177, 253, 254 R, 208/127, 248, 106, 177, 253, 91, 153, 299; 502/27, 22

[56] References Cited

U.S. PATENT DOCUMENTS

| | | | |
|---|---|---|---|
| 2,439,852 | 4/1948 | Jackson | 502/27 |
| 2,921,018 | 1/1960 | Helmers et al. | 208/114 |
| 2,944,002 | 7/1960 | Faulk | 208/91 |
| 2,956,004 | 8/1960 | Conn et al. | 208/91 |
| 3,024,203 | 3/1962 | Strecker | 252/413 |
| 3,150,075 | 9/1964 | Russell et al. | 208/120 |
| 3,165,462 | 1/1965 | Friedman et al. | 208/86 |
| 3,173,882 | 3/1965 | Anderson | 502/27 |
| 3,213,033 | 10/1965 | Hindin et al. | 502/27 |
| 3,256,205 | 6/1966 | Constabaris et al. | 502/27 |
| 3,341,470 | 9/1967 | Hensley, Jr. | 502/27 |
| 3,635,838 | 1/1972 | Gatsis | 502/27 |
| 4,243,514 | 1/1981 | Bartholic | 208/91 |
| 4,256,567 | 3/1981 | Bartholic | 208/252 |
| 4,263,128 | 4/1981 | Bartholic | 208/81 |
| 4,309,274 | 1/1982 | Bartholic | 208/80 |
| 4,328,091 | 5/1982 | Bartholic | 208/91 |
| 4,374,021 | 2/1983 | Bartholic | 208/251 R |
| 4,384,949 | 5/1983 | Reagan et al. | 208/91 |
| 4,419,225 | 12/1983 | Kukes et al. | 208/251 R |
| 4,427,538 | 1/1984 | Bartholic | 208/127 |
| 4,427,539 | 1/1984 | Busch et al. | 208/127 |
| 4,446,004 | 5/1984 | Bartholic | 208/127 |
| 4,454,240 | 6/1984 | Ganguli | 502/27 |
| 4,461,845 | 7/1984 | Dessau et al. | 502/27 |
| 4,478,708 | 10/1984 | Farnsworth | 208/127 |
| 4,485,183 | 11/1984 | Miller et al. | 502/27 |
| 4,618,346 | 10/1986 | Shapiro et al. | 44/15 R |
| 4,657,745 | 4/1987 | Hyatt | 423/128 |

FOREIGN PATENT DOCUMENTS

| | | | |
|---|---|---|---|
| 1163810 | 3/1984 | Canada | 502/27 |
| 1172653 | 2/1983 | European Pat. Off. | 208/251 R |

Primary Examiner—Curtis R. Davis
Assistant Examiner—Helane Myers
Attorney, Agent, or Firm—Inez L. Moselle

[57] ABSTRACT

A method for updating a concentrate of tar sands bitumen containing fine mineral matter and optionally coarse mineral matter in which solvent-diluted bitumen is contacted for a short time in a riser with hot attrition-resistant substantially catalytically inert acid-resistant fluidizable particles, causing a selective vaporization of the lighter high hydrogen content components of the bitumen. The preferred particles are composed of silica-alumina, most preferably a mixture of mullite and crystalline silica or mullite, crystalline silica and an acid-resistant form of alumina. A portion of the heavier asphaltenes and most of the components which contain metals, sulfur and nitrogen remain on the attrition-resistant fluidizable particles. Fine mineral matter in the bitumen feed also deposits on the fluidized particles instead of being carried over with the vaporized hydrocarbon product. The contact material, with deposit, is contacted with a solution of acid to remove the deposit of mineral matter and deposited metals without decomposing the particles of contact material. The heated particles of contact material are reintroduced into the riser for further contact with incoming diluted bitumen charge.

25 Claims, 3 Drawing Sheets

SYNTHETIC CRUDE OIL FROM TAR SAND BITUMEN

PROCESS FOR UPGRADING TAR SAND BITUMEN

RELATED APPLICATIONS

This is a continuation-in-part of Ser. No. 662,666, filed Oct. 19, 1984 now abandoned, Ser. No. 682,962, filed Dec. 18, 1984 now abandoned and Ser. No. 719,939, filed Apr. 4, 1985 now abandoned.

BACKGROUND OF THE INVENTION

This invention relates to a method for upgrading tar sand bitumen for the preparation of useful hydrocarbon products therefrom, such as a higher quality syncrude essentially free of metals and asphaltenes and with a much lower molecular weight. In particular, the invention relates to a method for upgrading bitumens derived from tar sands which contain mineral matter including a fine particle size fraction and a coarser size fraction.

Extensive deposits of tar sands, bituminous sand, bituminous diatomite and similar materials are known to exist throughout the world. These materials comprise a siliceous matrix of sands, sandstones or diatomaceous earth which is coated or saturated with relatively high molecular weight hydrocarbon materials. These deposits are generally located at or near the earth's surface, although some deposits may be buried by as much as two thousand feet of overburden. It has been estimated that the reserves of petroleum products recoverable from the known deposits of tar sands would be approximately equivlant to the world-wide reserves estimated for conventional crude oil.

As mined, the tar sands are present in general as agglomerates or lumps comprising sand or diatomite, mineral particles, water and viscous hydrocarbonaceous material called bitumen. While there is no universally accepted definition of "bitumen", it may be characterized as that portion of petroleum that exists in the semisolid or solid phase in natural deposits. It has been proposed by the United Nations Institute for Training and Research (UNITAR) that bitumens, or natural tars, be defined as the the petroleum component which has a viscosity greater than 10,000 mPa.s (cp) measured at the conditions in the deposit and gravity greater than 1,000 kg/m$^3$ (less than 10° API) at standard conditions of 15.6° C. (60° F.) and a pressure of one atmosphere. The definition was suggested at the Second International Conference on Heavy Crude and Tar Sands, held in Caracas Venezuela on Feb. 7-17, 1982. At that time it was also noted that a continuously variable spectrum of properties can be found not only geographically between deposits but also laterally and vertically within a given petroleum occurrence. Accordingly, the proposed definition employs essentially an arbitrary demarcation between bitumen and heavy crudes, when the materials are compared on the basis of these physical properties alone.

Additional distinctions between bitumen and conventional heavy crude oil may be made on the basis of their chemical compositions. Relative to most heavy crudes, bitumen has a large asphaltene component. Asphaltenes are complex, polynuclear hydrocarbons which are insoluble in n-pentane and/or n-heptane. Due to their substantial asphaltene content, bitumens exhibit a high carbon/hydrogen ratio. For the preparation of transportation fuels, it is generally necessary to reduce the carbon/hydrogen ratio by addition of hydrogen through catalytic hydrogenation. Bitumen typically also contains significant amounts of sulfur, nitrogen and metals as contaminants, often substantially more than most conventional heavy crudes.

The predominating mineral component of the tar sands bitumen material as mined is in most cases silica in the form of quartz sand or diatomite of particle sizes generally greater than about 10 microns, usually greater than about 44 microns (325 mesh) and up to about 10 mesh. The material as mined is surrounded by bitumen in quantities of perhaps about 5 to over 20 weight percent of the total composition. In addition, tar sands generally also contain finer mineral matter of particle size less than about 44 microns and larger than 2 microns, sometimes referred to as silt, and material finer than 2 microns, sometimes referred to as clay. Reference to U.S. Pat. No. 3,811,614. The fine mineral matter may include one or more of calcite, silica, rutile (TiO$_2$), calcium sulfate and mica as well as clay minerals such as kaolinites or smectite. The fine mineral matter generally has an appreciable content of alkaline earth material present as calcium carbonate and/or calcium sulfate. Fine mineral matter (i.e., mineral particles finer than about 10 microns) is generally present in quantities of from about 1 to about 50 weight percent of the total composition.

The bitumen as found in naturally occurring tar sands is not of great economic value in its crude form. Such bitumen, however, may be upgraded to hydrocarbons of lower molecular weight, in particular to hydrocarbons which are liquids at room temperature. Extensive recovery of tar sand oil has not been seriously considered until relatively recently, primarily because of the expense of known recovery and upgrading methods in relation to the cost of preparing the same products from crude petroleum. The rising costs of crude petroleum production and the depletion of known petroleum reserves, however, have made an efficient and economical process for the treatment of such tar sand increasingly desirable. The vastness of the known deposits has encouraged many people to look at these raw materials as a potential source for filling energy and chemical feedstock needs in a world of depleting conventional crude oil sources.

Several methods have been developed for purifying tar sands to provide bitumen concentrates that can be used as feedstock for further upgrading to produce useful products. The principal purification technique which has been applied to tar sands in order to concentrate bitumen therefrom is extraction. In one type of extraction, commonly known as the "hot water" process, advantage is taken of the fact that tar sands produce a bituminous slurry when mulled with hot water and sodium hydroxide. This slurry divides into two components upon further dilution with hot water in a settling zone. A bituminous froth rises to the surface of the water and is withdrawn for further concentration of bitumen, while essentially bitumen-free sand is discarded as a downward flowing aqueous tailings stream.

Another known beneficiation process for recovery of bitumen from tar sand is known as the "cold water" process. This process comprises the following steps: grinding the ore in the presence of water and a dispersant; flotation with fuel oil; dilution of the bitumen concentrate with solvent; and separation of beneficiated bitumen from the sand/water residue. This process for the preparation of a bitumen concentrate avoids the requirement of large quantities of heat needed to raise the temperature of the water in the process described in the preceding paragraph. In the first stage of preparation, the tar sands as mined are crushed, for example in a gyratory crusher, to form a coarse ore stock pile. Through the use of cone crushers, rod mills and/or ball mills, the latter possibly in closed circuit with cyclones, a product which is approximately 80% below 150 microns may be prepared. Water and a major portion of the conditioning and flotation reagents used in the process are then added to form a slurry. A variety of materials may be added to the crushed tar sand ore prior to conditioning and flotation. Fuel oil or other solvent, in quantities of about 5 lbs. per ton, may be added at this stage. Sodium carbonate (up to about 10 lb/ton) and/or sodium silicate (up to about 5 lb/ton) may also be employed. The slurry is then passed to one or more conditioning tanks. Some conditioning may also be accomplished merely by the flow of slurry through pipes over extended distances. The sized and conditioned slurry is then fed to a flotation circuit, comprising one or more flotation trains. Each of these trains comprises a rougher/scavenger unit and a single- or multiple-stage cleaner circuit utilizing flotation cells. A typical retention time in the flotation cells is on the order of 15 minutes. Tails from the scavenger cell are passed to thickeners, to which lime or another suitable flocculant, in an amount of about 5 lb/ton, is added. Overflow water from the thickener is recycled back into the circuit. A tailings slurry at about 50-60% by weight solids is discharged into a tailings pond. Concentrates from the last stage of the flotation process, containing approximately 25 percent by weight bitumen, are then suitable for further concentration, for example, by solvent upgrading. Unfortunately, fine mineral matter floats with the bitumen concentrate and is not effectively removed by flotation.

As currently practiced, bitumen concentrate from the flotation process is transferred to a mixing vessel where it is combined with at least one part, and generally several parts, of liquid solvent per part of bitumen. While the exact amount and composition of the solvent is not critical, it has been suggested that for maximum effectiveness the solvent should contain about 20% aromatics. Heretofore, the solvent has been almost entirely recovered in subsequent steps. It is possible to use the same fuel oil for solvent upgrading as is used in the flotation process. The diluted bitumen is pumped into settling or holding tanks, where the remaining water and sands begin to settle out.

The final stage of the solvent upgrading process comprises the solvent or diluent recovery stage. This may be a distillation tower or other mechanism which is used to separate solvent and flotation oils for recycling to upstream stages of the extraction process. Depending on the nature of the charge to the solvent upgrading step and the intended use for the concentrated bitumen, additional separation steps, such as dehydration or centrifugation may be necessary.

In yet another type of extraction process, tar sand agglomerates are contacted with a suitable solvent such as a gas-oil boiling range fraction to produce a solution of bitumen and gas-oil. This solution is separated from the sand and then passed to a conventional hydrocarbon conversion unit.

Treatment of tar sands by these beneficiation techniques in order to separate an enriched bitumen stream from the sand is a substantial component of the recovery costs, above those mining the crude ore. These processes generally provide products which contain residual fine mineral matter even after repeated treatments. The contents of fine mineral matter (particles finer than 10 microns) in beneficiated bitumen concentrates typically range from 2500 ppm to 20 weight %, usually below 2 weight %, based on the weight of the bitumen. Since at least a portion of the fine mineral particles forms a stable emulsion with water it cannot be readily removed from the bitumen recovered from tar sands. All of the known processes for preparing bitumen concentrates from tar sands provide products containing at least some residual fine mineral solids. Because of the viscosity of the bitumen and the chemical constitution of the components thereof, it has not been possible to remove the very fine mineral solids from the bitumen by conventional methods, such as hydroclone separators or conventional filtration means. This mineral matter, particularly the mineral matter of finest particle size, introduces additional complications in hydrogen addition treatments, as noted below. The water, which may be present in amount up to 15% based on the weight of the bitumen, also causes problems in downstream upgrading processes. For example, water causes foaming to take place in cokers.

Selective mining has been employed heretofore to minimize the content of mineral solids in bitumen concentrates obtained from tar sands. Tar sands bitumens containing high levels of fine mineral solids are generally not exploited. On the other hand, it is technically feasible but expensive to remove high levels of coarser mineral particles (sands) from bitumen.

In addition to mineral solids, bitumen concentrates generally contain high levels of sulfur, nitrogen, metals and other contaminants. These contaminants have also heretofore presented major problems in the subsequent use of the recovered product.

Retort methods similar to those used in the pyrolysis or thermal cracking of oil shale have been proposed for the recovery of bitumen from tar sands. The raw tar sand is contacted with spend sand and fluidized by reactor off gas at temperatures above about 900° F. Volatile products are flashed off while coke is deposited through thermal cracking. The coke is burned off in a separate unit at 1200°-1400° F. and the sand recirculated. Substantial amounts of spent sand, for example 5-10 parts per part of raw tar sand, are needed for the process. This makes necessary a very large retort volume per barrel recoverable oil. Serious waste heat and handling problems also arise with this process, making it of little interest commercially.

Once the bitumen has been recovered (concentrated) from the tar sands, two primary bitumen upgrading routes are available: carbon rejection and hydrogen addition. Carbon rejection upgrades bitumen by removing asphaltenes, and is examplified by conventional solvent deasphalting, delayed coking and fluid coking processes. Various modifications of the basic coking process have also been proposed. For example, U.S. Pat. No. 2,905,595 describes a process in which tar sands are subjected to a coking process to produce coker gas, gasoline and gas oil and a coke-laden sand stream. The coke-laden sand is contacted with an oxygen-containing gas, such as air, to effect combustion of coke deposited on the sand grains, thereby producing a clean hot sand stream which is recirculated into the process. According to the preferred method described in this patent, coke-laden sands are burned and heated in a specially-designed gas lift furnace. The coke-laden sand is suspended in a plurality of parallel vertical burning zones and recycled through a furnace zone surrounding these vertical tubes. This process produces a distillate product directly. The method essentially employs a recirculated stream of hot solids simultaneously to vaporize, coke and crack the hydrocarbon fraction.

U.S. Pat. No. 3,320,152 described a process in which tar sand agglomerates are introduced into a feed preparation zone and admixed with relatively hot contact material in order to drive off water and reduce the viscosity of hydrocarbon material, thereby providing a fluidizable mixture of sand particles and hydrocarbons. A portion of the fluidizable mixture is passed through a pressure-developing zone and then introduced into a reaction zone containing a fluidized bed of solid particulate material. This reaction zone is maintained under conditions to carry out thermal coking of hydrocarbon material.

U.S. Pat. No. 4,082,646 describes a modified direct coking process in which the combustion stage is divided into two sequential operations. In the first operation, coke solids produced in a reaction are introduced into a coke burning zone where they are contacted with combustion air and the minimum amount of supplementary fuel, if any needed to burn substantially all the coke. Part of the solids is discarded while the remainder, required for heating the coking reaction zone, is introduced into a fuel burner zone. Here the major portion of the supplemental fuel required to maintain heat balance is combined with air or oxygen to heat further the clean solids until their heat content is sufficient to meet the requirements of the coking reaction zone.

Carbon rejection alone cannot deal with the bitumen upgrading job in a cost effective manner. This is because an extraordinarily high amount of either a coke byproduct or an asphalt byproduct is produced. These by-products necessarily contain high contents of sulfur, metals and ash rendering the coke or asphalt relatively valueless. Moreover, the production of unnecessary coke or asphalt markedly reduces the yield of lighter, more valuable liquid hydrocarbons. This yield consideration is of particular importance with respect to tar sand processing, where mining represents roughly 80% of the total operating costs. Thus, an increase in usable fuel yields from each ton of ore can result in disproportionately large overall cost savings.

U.S. Pat. No. 4,161,442 describes a process in which high temperature solids comprising silica are combined with tar sands in a thermal stripping operation restricted not materially to exceed incipient cracking of the petroleum materials. The operating temperature is limited to within the range of 600° F. to 850° F., and preferably below 800° F. An oily residue deposited on the sand is used to generate fuel gas by heating to a temperature above 1500° F. with addition of steam or air. Since the fluid distillation is operated to minimize cracking, the concentration of residual oil material on the sand is relatively high, and only those components which vaporize below the temperatures of incipient cracking are removed. This process provides only minimal amounts of desirable liquid hydrocarbon products because of the low process temperatures employed.

An alternative route for the upgrading of bitumen is hydrogen addition. When hydrogen addition is used alone as the upgrading route, the large amount of hydrogen required to prepare useful products from the hydrogen-deficient asphaltene molecules raises the cost of the fuel produced thereby to unacceptable levels. Moreover, nickel, vanadium and asphaltenes interfere with the hydrogenation and conversion catalysts, shortening run lengths and requiring a more frequent replacement of catalyst. Any fines present in the hydrogen addition feedstock not only block the active sites of the hydrogenation catalyst, thereby reducing its activity, but also lead to the formation over time of obstructions in the flow path of the feedstock through the catalyst bed. This in turn leads to the development of large pressure gradients in the system, ultimately resulting in its shutdown. Combinations of prior art carbon rejection and hydrogen addition processes would only serve to compound the most undesirable characteristics of each.

Another method of deriving useful hydrocarbon products from heavier precursors such as bitumen is the method of catalytic cracking. During the 1930's, the process constituted a major advance over the earlier techniques for increasing pressure to charge catalytic cracking units with heavier crudes and products such as bitumen. Two very effective restraints have limited the extent to which this has been practical: the coke precursor content and the metals, especially heavy metals, content of the feed. As these values rise, the capacity and efficiency of the catalytic cracker are adversely affected.

Polynuclear aromatics, such as asphaltenes, tend to break down during the catalytic cracking process to form coke. This coke deposits on the active surface of the catalyst, thereby reducing its activity level. In general, the coke-forming tendency or coke precursor content of a material can be ascertained by determining the weight percent of carbon remaining after a sample of the material has been pyrolyzed. This value is accepted in the industry as a measure of the extent to which a given feedstock tends to form coke when treated in a catalytic cracker. One method for making this evaluation is the Conradson Carbon Test. When a comparison of catalytic cracking feedstocks is made, a higher Conradson Carbon number (CC) reflects an increase in the portion of the charge converted to "coke" deposited on the catalyst. The Conradson Carbon test has been adopted as an American National Standard and is described in ASTM Method D189. Another generally accepted method for evaluating coke precursor content is the Ramsbottom Carbon test, as described in ASTM Method 524. The Conradson Carbon test, however, is the preferred method for sample that are not mobile below 90° C., such as bitumens.

It has bee conventional to burn off the inactivating coke with air to "regenerate" the active surfaces, after which treatment the catalyst is returned to cyclic fashion to the reaction stage for contact with and conversion of addition feedstock. The heat generated in the burning regeneration stage is recovered and used, at least in part, to supply heat for vaporization of the feedstock and for the cracking reaction.

The regeneration stage generally operates under a maximum temperature limitation in order to avoid heat damage to the catalyst. When feedstock with a high CC content is processed, a larger amount of the feedstock in weight percent is deposited as coke on the catalyst than would be the case with low CC feedstock. When this catalyst is regenerated, the additional coke leads to high temperatures in the regenerator. At these higher temperatures, a number of problems arise. The circulation rate of the catalyst is reduced, often resulting in lower conversion rates. Incomplete regeneration of the catalyst may also occur, reducing its catalytic activity. Finally, if the temperature of the regenerator is sufficiently high, an inactivation of the catalyst takes place. There is thus a practical limit to the amount of coke which can be burned per unit time.

As CC of the charge stock is increased, cokeburning capacity becomes the limiting factor, often requiring a reduction in the rate of charge to the unit. Moreover, part of the charge is diverted to an undesired reaction product, thereby reducing the efficiency of the process. Since bitumen comprises to a great extent hydrogen-deficient, high molecular weight hydrocarbons such as asphaltenes, a direct catalytic cracking of bitumen would clearly be a highly inefficient method for upgrading for this reason alone. This is confirmed by Bunger et al., "Catalytic Cracking of Asphalt Ridge Bitumen", *Advances in Chemistry Series*, No. 179, "Refining of Synthetic Crudes", p. 67 (1979). These authors report an inhibited rate of catalytic cracking, low octane numbers for the gasoline produced and substantially higher coke make than experienced presently for commercial gas-oil cracking.

An additional drawback to direct catalytic cracking of bitumen is the metals content of the feed. Most bitumens contain heavy metals such as nickel and vanadium. These metals are deposited almost quantitatively on a catalytic cracking catalyst as the molecules in which they occur are broken down. The deposits of these metals build up over repeated cracking cycles to levels which become troublesome. Some of these metals also unfavorably alter the chemical composition of catalysts. For example, vanadium tends to form fluxes with certain components of common FCC catalysts, lowering their melting point to a degree that sintering begins at FCC operating temperatures with resultant loss of catalytic activity.

The heavy metals present in bitumens recovered from tar sand are also potent catalysts for the production of coke and hydrogen from the cracking feedstock. The lowest boiling fractions of the cracked product—butane and lighter—are processed through fractionation equipment to recover components of value greater than as fuel for the furnaces. This fraction comprises primarily of propane, butane and olefins of like carbon number. Hydrogen, being incondensable in the "gas plant", occupies space as a gas in the compression and fractionation train. As the metals level of the charge stock is increased, hydrogen production becomes the limiting factor, often requiring a reduction in the rate of charge to the unit. Moreover, since bitumen is already hydrogen deficient, the generation of additional hydrogen therefrom would be a serious problem.

The sodium content of bitumen also present problems for a conventional catalytic cracking system. Sodium reacts with a zeolite catalyst to produce the inactive form of zeolite. The product bitumen generally contains at least about 1% water, with significant amounts of sodium compounds dissolved therein. These sodium compounds comprise primarily sodium carbonate and sodium hydroxide, which are conventionally used as conditioning agents in the upgrading of tar sands. These compounds are deposited on the catalyst as the bitumen is subjected to catalytic cracking, and can lead to a substantial deactivation of the catalytic cracking catalyst over time, requiring its replacement. Sodium, like vanadium, also tends to form fluxes with certain FCC catalyst components.

THE INVENTION

Accordingly, it is an object of the invention to provide methods for deriving a useful hydrocarbon product from tar sands bitumens in an economically acceptable manner.

It is a further object of the invention to provide methods for upgrading bitumen derived from tar sands which maximize the yield of higher-value middle distillate components, while avoiding the disadvantages of the known upgrading routes for tar sand bitumen.

It is an additional object of the invention to provide a method for upgrading a concentrate of bitumen which is not adversely affected by the content of fine particle size mineral matter and water in the bitumen concentrate.

It is another object of the invention to provide a method for upgrading bitumen which results in a product with reduced Conradson Carbon number, sulfur and nitrogen, and a minimized content of metals and fine mineral matter.

An embodiment of the invention involves the provision of a method for upgrading a concentrate of bitumen which makes effective use of at least a portion of coarser residual mineral matter contained therein.

The present invention provides a process for upgrading a charge of a tar sand bitumen concentrate containing fine mineral matter or fine and coarse mineral matter. The process comprises contacting the charge of tar sand bitumen concentrate in a riser contactor in the presence of a low boiling organic solvent diluent with finely divided attrition-resistant particles, preferably microspheres, of substantially catalytically inert solid which are also substantially insoluble in solution of mineral acid. The contact of the charge with the fluidizable particles is at high temperature and short contact time which permits vaporization of the high hydrogen containing components of the bitumen, the period of time being less than that which induces substantial thermal cracking of the bitumen. At the end of this time, the vaporized product is separated from the fluidizable particles now bearing a deposit of both combustible solid, metal, and, unexpectedly, adherent particles of finer mineral matter originally present in the bitumen concentrate. The particles of inert solid with deposit of combustibles, metals and adherent fine mineral matter are passed to a regenerator at a temperature below 2000° F., usually below about 1800° F., to oxidize the combustible portion of the deposits. In one embodiment of the invention, the regenerator is provided with cyclones and high velocity air jets, whereby a portion of the adherent deposit is selectivity attrited off of the particles of contact material by design of cyclones and air distribution to induce attrition and a ball milling action. The material removed by attrition is recovered in bag houses, cyclones or scrubbers downstream from the regenerator burner. At least a portion of the deposit of fine mineral matter is then leached from the particles of contact material by removing the inert solid from the regenerator and contacting the removed inert solid with a solution of mineral acid. Usually at least a portion of the deposited metals are also leached. Fluidizable solid, depleted at least in part of fine mineral matter, is circulated to the regenerator and then into contact with incoming charge of tar sand bitumen concentrate and diluent.

If the mineral matter accreted on the particles of contact material were not removed by some means, a dense shell would form on the particles of contact material which would grow in size. The resulting material would not be useful in removing metals in a riser contactor unless extremely high addition rate of fresh contact material was to be practiced. This is demonstrated by the following estimation of what would occur if removal of accreted mineral matter did not take place in a commercial selective vaporization contactor operated with a feed containing 1 wt % fine material matter (3.5# fine mineral matter/barrel), 70 ppm Ni+V and with fresh contact material added to control metals level on equilibrium contact material to 30,000 ppm. If no fine mineral matter were deposited, 1.2 #/barrel of fresh contact material per 100 ppm Ni+V would be needed; hence 0.84 #/barrel of contact material would be needed in the cited case of feed containing 70 ppm Ni+V. If 1 wt. % finer mineral matter were permitted to accumulate and form a dense shell, the weight of deposited mineral matter per unit weight of fresh contact material would be 4.16#/# contact material (3.5# fine mineral matter deposited/0.84# contact material). In other words, the weight of the contact material would be multiplied by a factor of about four and the size of the particles of contact material would increase correspondingly to levels not suitable for use in a riser. Laboratory test results indicate that at these levels the deposited mineral matter may impart undesirable catalytic cracking properties to contact material originally substantially catalytically inert.

In a preferred embodiment of the invention, the inert solid comprises kaolin clay which has been calcined at high temperature, above 1800° F. and preferably above 2000° F., prior to use in the process. Among other things, high temperature calcination serves to render the kaolin clay substantially inert to acid. Even if the deposited mineral matter includes minerals such as kaolins, such clay would not have been exposed to thermal conditions which would render such clay material inert to attack by acid. Consequently, the acid soluble components of any deposited clay, such as alumina and iron, could be selectively dissolved from withdrawn (spent) contact material by action of the mineral acid without undesirable dissolution of the inert solid.

The especially preferred inert solid contact material is composed of particles which comprises a mixture of crystalline mullite and crystalline silica and substantially all of the silica is present in mullite and crystalline silica and substantially all of the alumina is present in mullite or mullite and acid insoluble acid alumina such as alpha alumina. The advantage of using the especially preferred mullite-crystalline silica composition is that metals, especially vanadium and nickel, deposited on the contact material during use may be effectively removed from the system by treatment with acids without decomposing the particles of contact material. It should be noted that an acid treatment which will result in the efficient removal of deposited vanadium and nickel may require conditions more severe than those that will suffice to remove the deposit of mineral matter. Consequently, when substantial amounts of vanadium and nickel are removed by treatment with mineral acid, an undesirable amount of alumina may be co-extracted from contact material (calcined clay) in spite of the fact that minimal alumina would be co-extracted if deposited mineral matter were removed but vanadium and nickel were not also present.

Most preferably, the contact material is in the form of fluidizable microspheres which analyze at least 95% by weight combined $SiO_2$ and $Al_2O_3$ and consist essentially of mullite crystals and crystalline silica, the microspheres having a mullite index of at least 45, an EAi below 1%/sec., a surface area below 5 $m^2/g$, a total porosity in the range of 0.01 to 0.09 cc/g and a pore structure such that the majority of the pores are larger than 100 Angstrom units in diameter. Especially preferred are microspheres further characterized by a resistance to agglomeration below about 25 when tested by the static agglomeration test method hereinabove described at a metals loading of 8 weight % nickel plus vanadium, and a vanadium/nickel weight ratio of 4/1.

In one embodiment of the invention, the regenerator is provided with cyclones and high velocity air jets to attrite portions of fine particle size mineral matter deposited on the attrition-resistant particles of contact material. Mineral matter removed by attrition from the regenerator is then recovered, as described in Ser. No. 719,939. Additional mineral matter may then be removed by contact with hot mineral acid.

In an embodiment of the invention, spent fluidizable inert contact material is withdrawn on a continuous or semi-continuous basis in order to maintain a predetermined average metal content in the circulating contact material and to prevent, in conjunction with the removal of deposited mineral matter, the buildup of high levels of metals as a deposit on the particles of contact material.

In another embodiment, the tar sand bitumen concentrate is prepared by wet processing such as flotation or gravity separation. The wet processed tar and bitumen is further processed by solvent extraction to recover a bitumen concentrate. In practice of this embodiment, the charge is preferably diluted with at least a portion of the solvent used in the purification to obtain the concentrate, whereby the amount of solvent that is removed by fractionation from said concentrate prior to contact with the heated fluidizable solid is reduced or eliminated.

In another embodiment of the invention, the charge is diluted with light gas oil and/or gas recovered from the vaporized product obtained by contact of a previous charge of tar sand bitumen concentrate with hot fluidizable inert solid.

In order to disclose more clearly the nature of the present invention, the following drawing, description and examples illustrating specific embodiments of the invention are given. It should be understood, however, that this is done solely by way of example and is intended neither to delineate the scope of the invention nor the ambit of the appended claims.

Figure 3:
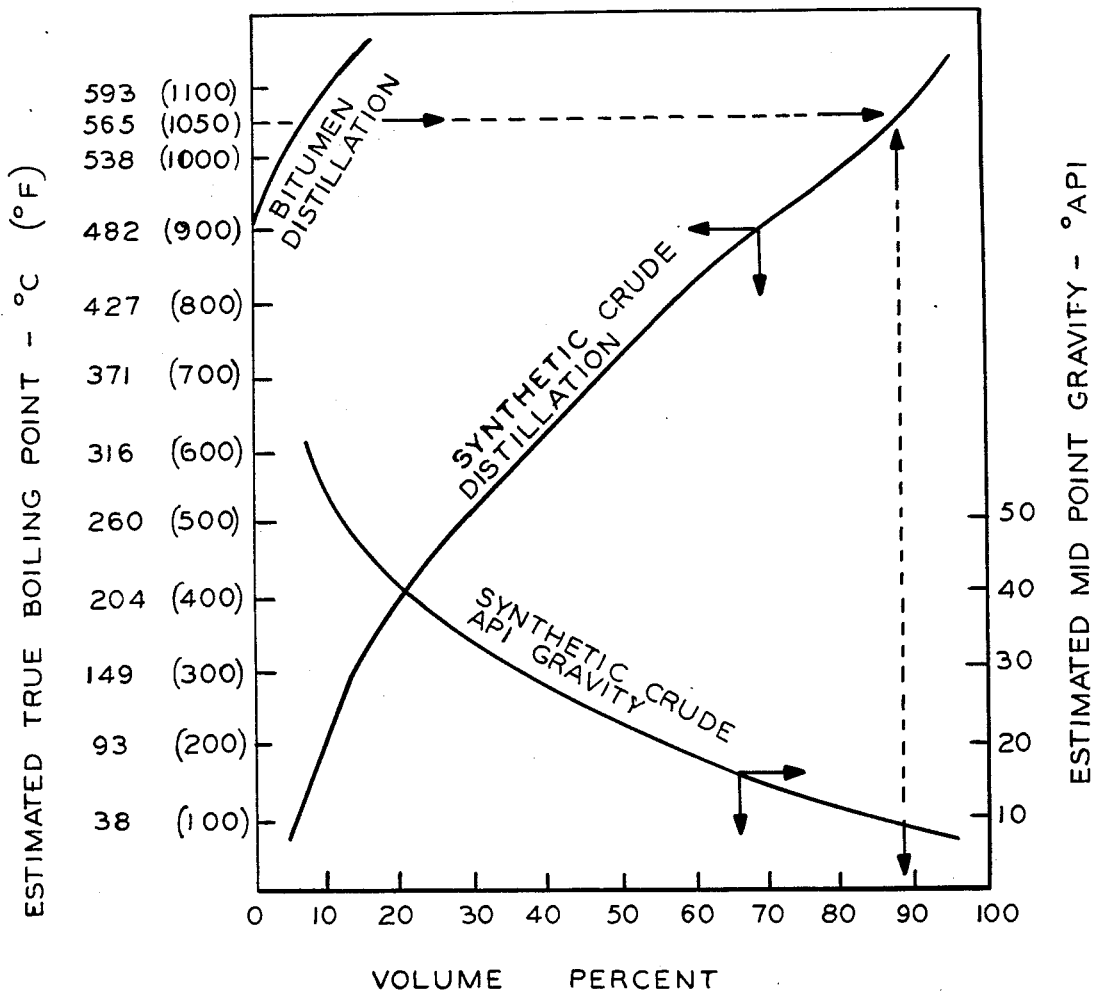

FIG. 3 contains distillation curves of tar sand bitumen feedstock and a synthetic crude product obtained therefrom.

DESCRIPTION OF SPECIFIC EMBODIMENTS

1. Selective Vaporization Process

The selective vaporization process of the invention is a modification of the process disclosed in U.S. Pat. No.

4,263,128, which removes from the feedstock most of those contaminants which would poison downstream conversion processes, while retaining those having a high hydrogen content. The teachings of U.S. Pat. No. 4,263,128 are incorporated herein by cross-reference hereto. The selective vaporization process also shifts the range of compounds in the feedstock towards the middle distillate range, thereby reducing residual oils and molecular weight. In the process of the invention, the selective vaporization process also removes fine mineral matter and thus minimizes contamination of products. The process of the invention can also utilize feedstocks containing significant levels of coarse mineral matter (sands).

The solid contacting agent is essentially inert in the sense that it induces minimal cracking of heavy hydrocarbons by the standard microactivity test conducted by measurement of amount of gas oil converted to gas, gasoline and coke by contact with the solid in a fixed bed. Charge in that test is 0.8 grams of mid-Continent gas oil of 27° API contacted with 4 grams of catalyst during 48 second oil delivery time at 910° F. This results in a catalyst to oil ratio of 5 at weight hourly space velocity (WHSV) of 15. By that test, the solid here employed exhibits a microactivity less than 20, preferably about 5. The most preferred solid contact material composed of mullite and crystalline silica typically has a microactivity less than 1–3.

The selective vaporization process is operated to minimize molecular conversions of that portion of the hydrocarbon feedstock which is suitable for later catalytic cracking or other methods for producing high octane hydrocarbon products. The asphaltenes present in the bitumen are either converted to lower molecular weight hydrocarbons or deposited on the contact material. The selective vaporization process also removed essentially all of the metals (over 90%, and typically over 95%).

In order to cope with the contaminant concentration and the viscosity of tar sand bitumen employed, it is generally desirable to dilute the feedstock unless sufficient solvent is already present. One particularly suitable diluent which may be employed in the selective vaporization process is a clean, light gas oil boiling in the 250°–600° F. range which is produced from tar sand bitumen by the selective vaporization process. This light gas oil material is repeatedly recycled through the selective vaporization process as a captive diluent material. This diluent is practically devoid of carbon residue or metal. In general, at least one equivalent by weight of diluent is used per unit of bitumen.

Another suitable diluent for use in the selective vaporization process is the solvent employed during the purification of the bitumen from water and sand. This solvent may be left in large part in the bitumen, rather than being removed by fractionation as customarily done. This results in overall energy savings in the production scheme. Solvent can be allowed to remain, in whole or in part, within the bitumen stream introduced into the selective vaporization process. See the accompanying FIG. 1. This allows for a single fractionation of the purified bitumen, rather than fractionation in two stages—once during the conventional solvent "cleanup" and again during the selective vaporization process.

Figure 1:
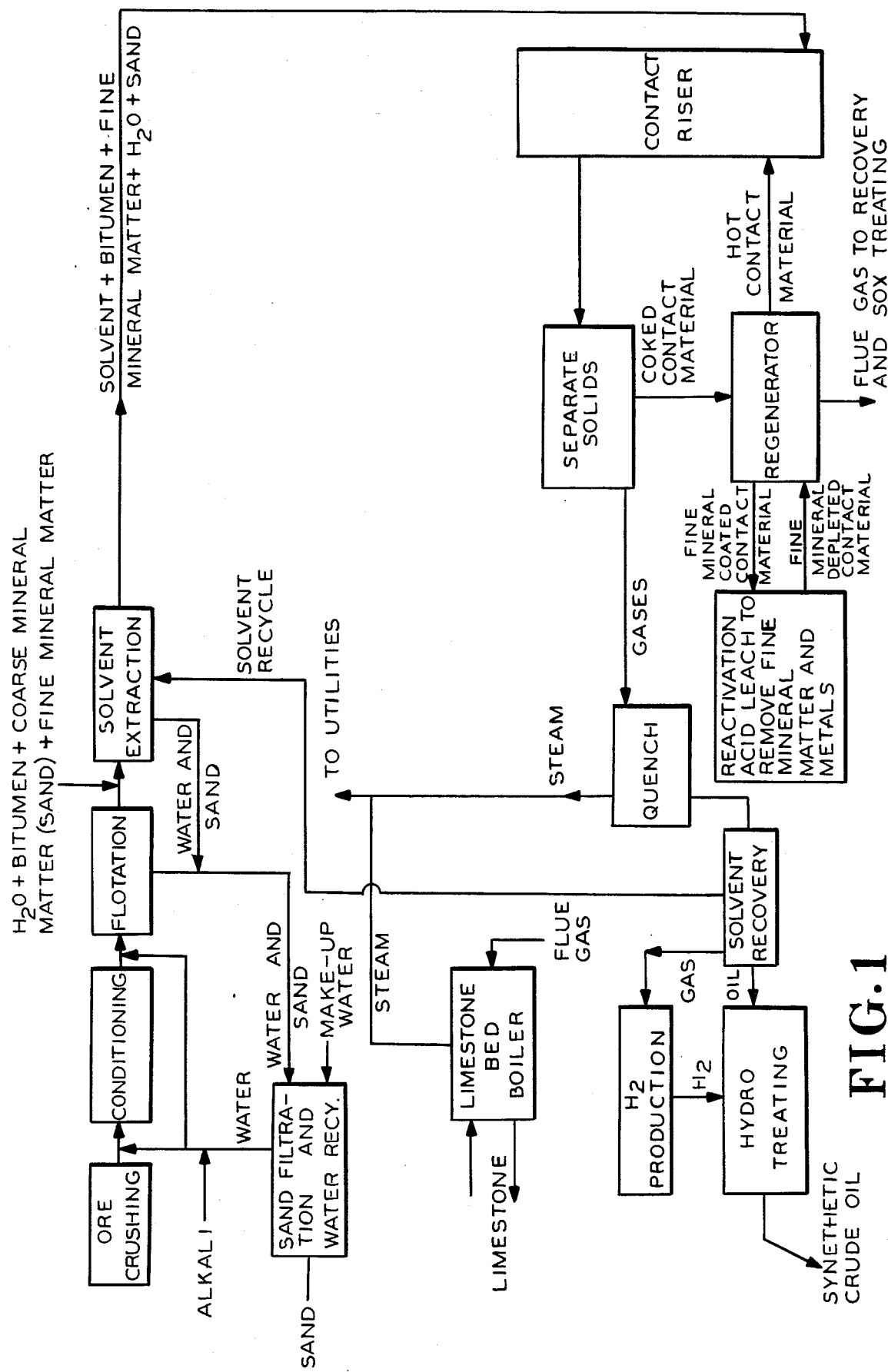
FIG. 1 is a schematic diagram of a tar sands bitumen upgrading process incorporating selective vaporization and utilizing solvent employed in upgrading the bitumen as diluent for the bitumen in the selective vaporization contactor.

Referring to FIG. 1, crude tar sand bitumen ore is crushed, conditioned with alkali (e.g., sodium hydroxide) and water and subjected to flotation to produce as a float product a concentrate of bitumen mixed with water, coarse mineral matter (sand) and finer mineral matter. The underflow from the flotation cell, a concentrate of sand and water, is charged to a filter for recovery of water which is reused in the flotation plant. The float product is then subjected to solvent extraction, using, for example, fuel oil in an amount roughly equal in weight to the weight of the bitumen. Without recovering the solvent in fractionation equipment, as in conventional tar sands bitumen beneficiation, the solvent diluted mixture of bitumen, fine mineral matter, water and possibly sand, is circulated through the contactor riser/regenerator system shown in detail in FIG. 2. The regenerator (burner), discussed below in connection with the description of FIG. 2, may be one that operates with cyclones and high velocity air which attrites clay deposited on the fluidizable particles of hot contact material circulating in the system. When such cyclones are used, the flue gas from the regenerator therefore contains the attrited deposit of fine mineral matter as well as fines resulting from physical breakdown of contact material. Unless all sand is removed by the cyclones associated with the riser, fine sand will also be present in the flue gas. These fines are recovered by conventional means such as baghouses after separation from the flue gases which are handled in equipment suitable to remove oxides of sulfur before discharge to the atmosphere.

In the process shown in FIG. 1, product from the selective vaporization riser, after quench and fractionation to separate the solvent and gas from the syncrude, is passed to a hydrotreating facility to produce a synthetic crude oil. Solvent liquified and separated after the quench is recycled to the solvent extraction plant. Flue gases from the regenerator are processed to remove oxides of sulfur in a limestone bed boiler and steam recovered during this operation is used to operate utilities. The gas produced in the selective vaporization riser is used to provide hydrogen for the hydrotreater.

In general, an initial charge of fluidizable contact material is made to circulate into the contacting zone, into the burning zone and again into the contacting zone prior to the introduction of feedstock. A combustible material, such as what is sometimes referred to as "torch oil", is charged to the selective vaporization process burning zone to initiate combustion. This material may be a waste product from a refinery. The heat of combustion of this material was the system to the operating temperature range. Feedstock is then introduced and torch oil injection discontinued.

As noted earlier, it is technically feasible but costly to remove coarse mineral matter from tar sands and the residual content of fine minerals in bitumen derived from tar sand has in the past proved to be a major problem in the subsequent upgrading of these tar sands. One of the advantages of the instant invention is these fine mineral particles have a minimal adverse impact upon the selective vaporization process because the fine mineral particles are continuously removed from the system and at least that portion of the coarser mineral particles which is or can be sized to form a fluidizable solid mass can be used as contact mineral in upgrading charges of bitumen concentrates.

The bitumen feed may comprise a crude bitumen concentrate prepared by extraction or one which has been subjected to some additional treatment, such as solvent upgrading.

For treatment of the initial bitumen charge as well as for use throughout the selective vaporization process, the calcined kaolin clay microspheres described in Ser. No. 681,962 now abandoned filed Dec. 18, 1984 are especially preferred. These microspheres contain a mixture of crystals of mullite and silica. Commercial sources of mullite and crystalline silica may be used after being ground and sized to a particle size distribution such that the material can be fluidized.

The heat requirements of the system are supplied essentially by the heat of combustion of the coke deposited on the contact material during the vaporization process. The requirements include the heat necessary to bring the various components of the feed (hydrocarbonaceous material, entrained water and any sand, etc.) to the contactor temperature and the heat of vaporization and reaction of the various hydrocarbon feed components. The regenerator heat requirements must also be considered. These include the heat necessary to bring air, contact material and the deposited coke to the regeneration temperature. Finally, some allowance must be made for heat loss to the environment. Through evaluation of these heat balance requirements of the system, it has been determined that raw bitumen charge containing optionally up to about 7.5% by weight of coarse mineral matter (sand) that does not deposit on particles of contact material relative to the bitumen can be treated through the selective vaporization process with a practical minimum conversion to coke equivalent to about 80% of the Conradson Carbon value. Moreover, upwards of 300% by weight coarse mineral matter in the bitumen charge could be accommodated, albeit with a higher production of coke. The bitumen charge may also contain substantial amounts of water. For the limiting case in which the sand content of the feed is minimal and the conversion to coke is equivalent to 80% of the CC value, at least 14 weight percent of the charge based on the bitumen may be water, and as much as about one-half of the charge as water can be accommodated with an acceptable level of coke production.

The selective vaporization process is characterized by short residence times of the charge in the contactor. As used herein, hydrocarbon residence time is calculated as length of the contactor from the charge introduction point to the point of separating solids from vapors divided by the superficial linear velocity at the solids separation point, thus assuming that linear velocity is constant along the contactor. The assumption is not strictly accurate but provides a highly useful measurement. As so measured, the hydrocarbon residence time will be less than 5 seconds and preferably less than 3 seconds when applying the process to best advantage. Since some cracking, particularly of the deposit on the inert solid, will take place at the preferred temperatures for bitumens, the extent to which residence time can be reduced is often limited by characteristics of the equipment employed. If the equipment permits, residence times of less than 2 seconds are preferred and residence times of less than one second are most preferred.

In general, the selective vaporization process is carried out under temperatures and pressures corresponding to those currently used in selective vaporization of heavy crudes and distillation residua thereof. The contact material is generally heated above about 1100° F.; the upper temperature limit is determined by the particular burner employed and rarely exceeds 1800° F. When impacted by the charge, the contact material has in most cases a temperature of at least 800° F.; temperatures above 850° F., and most particularly in the range of 900°–1050° F., are preferred. The operating pressures in the system are preferably as low as possible. This pressure rarely exceeds 50 psia, and is usually about 20–35 psia.

The instant invention is preferably conducted in a contactor very similar in construction and operation to the riser reactors employed in modern fluid catalytic cracking (FCC) units. Bitumen charge prepared according to the cold or hot water processes described above, diluted with an equal weight of low boiling hydrocarbon diluent such as kerosene and containing about 2500 ppm to 7 wt % fine mineral matter based on the bitumen, is introduced at the lower end of a vertical conduit. Unless sufficient solvent used to refine the upgraded tar sands remains with the bitumen, additional volatile material, such as light hydrocarbon recycled in the process, steam, gas and/or water, is added in amounts sufficient to decrease substantially the hydrocarbon partial pressure of the feedstock. The pressure in the system should be sufficient to overcome pressure drops, and is generally on the order of 20 to 50 psia. The charge may be preheated in a heat exchanger or a furnace before introduction to the contactor. This preheating may be to any desired temperature below thermal cracking temperature. Typically, the charge may be heated to about 200°–800° F., and preferably to about 300°–700° F. HIgher temperatures would induce thermal cracking of the feed, with the result being increased production of low valued product.

Figure 2:
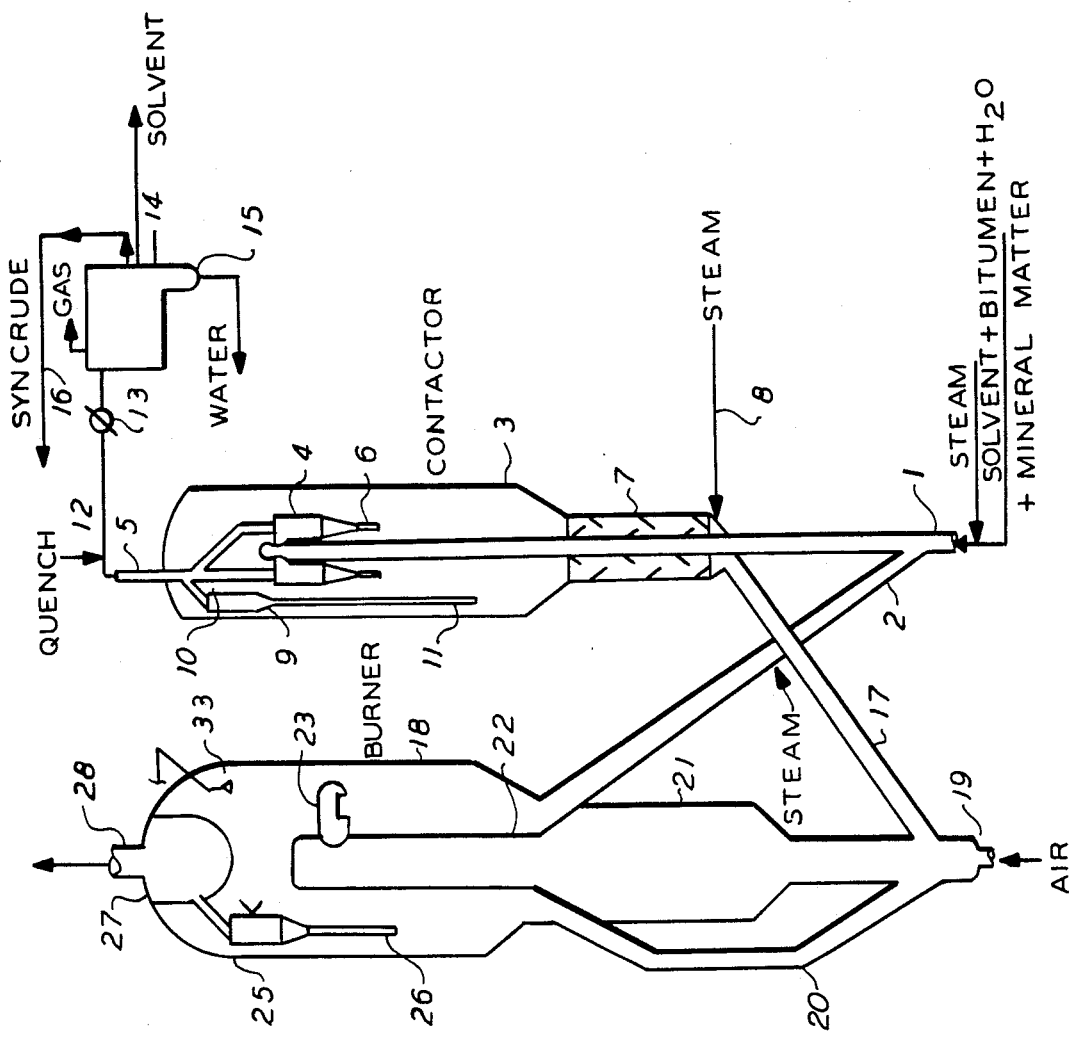
FIG. 2 is a diagrammatic sketch of a selective vapor system for upgrading tar sand bitumen concentrates in a rise/burner system.

With reference to the accompanying FIG. 2, the feed, optionally further diluted by light hydrocarbons, steam or the like, rises in the contactor 1 at high velocity, such as for example 40 feet per second. Hot inert solid in finely divided form is introduced into the feed from a standpipe 2 in a quantity sufficient to provide a mixture at a suitably elevated temperature which causes deposition of all components of high CC number and high metal content as well as the majority of the fine mineral matter onto the contact material and volatilization of lighter, hydrogen rich hydrocarbons.

The length of the contactor 1 is such to provide a short residence time for contact between the feed and the contacting agent. This is preferably on the order of 3 seconds or less, more preferably about 2 seconds, and most preferably 1 second or less. The residence time, however, should be sufficiently long to allow for good uniformity of contact between the feed and the contacting agent, i.e., at least about 0.1 second. The residence time is calculated on the basis of the vapor residence time determined from outlet conditions.

At the top of the contactor, e.g., about 30 to 40 feet above the point of introduction of contacting agent from standpipe 2, vaporized hydrocarbons are separated as rapidly as possible from particulate solids bearing the high CC deposits and metals. This may be accomplished by direct discharge from the contactor into a large disengaging zone defined by vessel 3. It is, however, possible that the contactor discharge the product directly into cyclone separators 4 from which vapors are transferred to vapor line 5. Entrained solids drop into the disengaging zone by diplegs 6 to a stripper 7. Stream and/or hydrocarbons admitted to stripper 7 by line 8 evaporate traces of volatile hydrocarbons from the solids.

The mixture of steam and hydrocarbons, together with entrained solids, enters cyclone 9 by opening 10 to disengage the suspended solids for return to stripper 7 by dipleg 11. As is well known in the art, a plurality of cyclones 4 and 9 may be used. These cyclones may be multistage, with gas phase from a first stage cyclone discharging to a second stage cyclone.

The cyclones may be of the stripper cyclone type described in U.S. Pat. No. 4,043,899. In this case, the stripping steam admitted to the cyclone may be at a relatively low temperature, such as 400°–500° F., and may serve to perform part or all of the quenching function presently to be described. Alternatively, superheated steam or gas may be introduced to keep the products from condensing before an external quench. A system of preference in the present invention is the vented riser described in Meyers et al. U.S. Pat. Nos. 4,006,533 and 4,070,159.

One embodiment of the invention utilizes high efficiency cyclones. With such design, cyclone efficiency will increase so that the minus 40 or minus 20 micron sand will essentially stay in the unit. As this material is retained in the unit, it will become part of the circulating inventory and increase the inventory. It will eventually become 100% of the inventory and will need to be withdrawn as the inventory increases. This will eliminate the need of fresh contact material and will in effect become a manufacturing facility for producing contact material. This same phenomena will occur if the efficiency of the extraction plant decreases (i.e., mineral content of the bitumen concentrate feedstock increases.) Therefore, sands originally in the bitumen are converted into a useful contact material after proper sizing for proper fluidization in the unit used to upgrade further charges of tar sand bitumens or even for non tar-sands operations. This could be before or after acid leach to remove deposited metals. As an example, if the tar sands bitumen contains 1% mineral matter as sand, it will contain about 3.0 to 3.3# of sand per barrel of feed. If the metals level of the feed is 100 ppm, it would take about 1#/bbl of retained fresh contact material as makeup to control the metals level on the circulating material at 30,000 ppm. Since the feed has about 3# sand/bbl and if it is assumed that all of this is retained in the unit, then fresh contact material addition would not be needed and the equilibrium metals level will be about 10,000 ppm. This will also require removal of 3#/s sand/bbl from the unit with about 10,000 ppm metals which could be used for fresh contact material addition.

The vaporized hydrocarbon from cyclones 4 and 9 passing by way of line 5 is then mixed with cold hydrocarbon liquid introduced by line 12 for the purpose of quenching thermal cracking. The quenched product is cooled in condenser 13 and passed through accumulator 14. Gases are removed for fuel from accumulator 14, and water, if any, is taken from sump 15, preferably for recycle to the contactor for generation of steam to be used as an aid in vaporizing charge at bottom of the riser and/or for removing heat from the burner. Condenser 13 may be advantageously set up as a heat exchanger to preheat charge to the contactor or to the FCC Unit employed subsequently.

In one embodiment, quenching is advantageously conducted in a column equipped with vapor-liquid contact zones such as disc and doughnut trays and valve trays. Bottoms from such a column quencher (Syncrude) could go directly to catalytic cracking or hydrotreating with overhead passing to condenser 13 and accumulator 14 or the overhead could be further fractionated to recover the solvent, recycle streams, and naphtha, gas and water from accumulator 14.

Certain advantages can be realized in the system by the use of recycled light hydrocarbons at the bottom of contactor 1 for further vapor pressure reduction if the solvent is present in amount sufficient to reduce the viscosity of the bitumen to an acceptable level but is not present in amount to achieve the desired reduction in hydrocarbon vapor pressure. Recycle of water from accumulator 14 for this purpose requires that the effluent of the contactor be cooled to the condensation point of water. In this water vapor/hydrocarbon vapor system, that temperature would be about 150° F. When hydrocarbons are used for pressure reduction and as the stripping medium at line 8 condensation becomes unnecessary when only small amounts of water are associated with the bitumen. In particular, the use of hydrocarbon both as diluent and for vapor pressure reduction allows for efficient recycling of this material. The contactor effluent may be passed directly to a catalytic cracking reactor. In this case, the contactor also functions as the catalytic cracking preheat furnace.

The light hydrocarbons chosen to boil below the temperature in contactor 1 for use both as diluent and as means for vapor pressure reduction are preferably recycled in the process. While for purposes of vapor pressure reduction, light hydrocarbons such as naphtha, kerosene and/or gas oil fractions derived from the process may be employed, the use of the gas fraction derived from the process is preferred. In particular, the use of these liquid solvents during the separation of bitumen from the raw tar sand and their retention in the selective vaporization feedstock leads to an especially efficient system.

The liquid hydrocarbon phase from accumulator 14 is a desalted, decarbonized and demetallized fraction which, after removal of any entrained particulate sand not removed by cyclones 4 and 9, would be satisfactory charge for catalytic cracking or, where desired, hydrotreating to increase the hydrogen content. This product of contact in contactor 1 may be used in part as the quench liquid at line 12. The balance is preferably transferred directly to a subsequent refining stage via line 16. This product may be optionally treated with a particulate separation means prior to refining.

In stripper 7, the catalytically inert solid particulate material, bearing a discontinuous coating of particles of deposited mineral matter, passes by a standpipe 17 to the inlet of burner regenerator 18. Most commercial regeneration unit designs operate with air distributors in the combustor as a jet at 125 to 400 feet per second (fps). As material is charged perpendicularly into the regenerator into contact with air jets at 125–400 fps the effect will be a combination of a fluid energy mill and a ball milling action, the latter taking place by particle-to particle contact. Assuming circulation of regenerated contact material at 4#/# feed, there will be 400# contact material/# mineral matter when operating with a bitumen feed containing 1 wt % mineral matter. This will provide an ample number of collisions to remove protuberances of deposited mineral matter containing metals before it can build up into a dense, attrition resistance shell.

This inert contact material also bears a deposit of high CC and metallic content material. Standpipe 17 discharges to a riser 19 where it meets a rising column of air introduced into line 19. The spend particles are mixed with hot inert particles from burner recycle 20, whereby the mixture is rapidly raised to a temperature for combustion of the deposits from treating the bitumen, e.g., 1200°–1600° F. The mixture enters an enlarged zone 21 to form a small fluidized bed for thorough mixing and initial burning of deposits. The flowing stream of air carries the burning mass through a restricted riser 22 to discharge at 23 into an enlarged disengaging zone. The hot burned particles, now largely free of combustible deposit, and mineral protuberances containing metals, fall to the bottom of the disengaging zone, burner 18. A portion of the particles is introduced into recycle 20. Another part enters standpipe 2 for supply to contactor 1 after steam stripping. Because of the high temperatures which can be obtained in this type of burner, CO will burn to provide a flue gas containing very little of that gas in the presence of a stoichiometric excess of oxygen. In other types of burners, the combustion products may contain substantial amounts of CO which may be burned for its heating value in CO boilers of the type commonly used in FCC units.

In the type of burner shown, the gaseous products of combustion, containing carbon dioxide, some residual oxygen, nitrogen, oxides of sulfur and nitrogen, and perhaps trace CO, enter a cyclone 25 to disengage entrained solids for discharge by dipleg 26. As is known in the art, a plurality of such cyclones may be used. The clarified gases pass to a plenum 27 from which flue gas is removed by outlet 28.

Although the system just described bears a superficial resemblance to an FCC unit, its operation is very different from that of an FCC system. Of greatest significance is the fact that the contactor 1 is operated in such a manner as to remove from the charge an amount not greatly in excess of the equivalent of twice the Conradson Carbon value of the feed. This is achieved by the very low severity cracking due to the inert character of the solid and the very short residence time at cracking temperature. It is generally recognized that cracking severity is a function of time and temperature. Accordingly, increased temperature may be compensated for by reduced residence time, and vice versa. Ideally, no more than 120% of the CC equivalent is removed from the charge in the form of coke. The practical lower limit for the selective vaporization of bitumen is about 80% of the CC equivalent.

The selective vaporization process affords a control aspect not available to FCC units in the supply of hydrocarbons or steam to the contactor. When stocks of high CC number are processed, the burner temperature will tend to rise because of increased supply of fuel to the burner. This may be compensated for by increasing the amount of hydrocarbons and/or steam supplied to reduce initial pressure of hydrocarbons in the contactor or by recycling water from the overhead receiver to be vaporized in the contactor to produce steam.

After transfer via line 16, the hydrocarbon product may be introduced to the feed line of an FCC reactor operated in the conventional manner. Because the FCC unit provides a product under normal operations containing some fines generated through abrasion of the FCC catalyst, it has been generally necessary to employ some means of physical separation to remove these fines in the FCC unit itself. Accordingly, the charge to the FCC unit need not be treated to remove entrained mineral particles prior to charging.

When the products of selective vaporization of bitumen are to be subjected to a hydrogen addition treatment, removal of most of the entrained solids should be carried out in order to minimize pore blockage of the hydrogenation catalyst and blockages in the hydrogen addition unit. It is particularly advantageous to collect the selective vaporization products with any entrained fine mineral particles in a settling tank prior to hydrotreating. The bottoms from this settling tank could be fed directly into a catalytic cracker, burned in the regenerator or simply removed from the system. The lighter fraction, referred to as "clarified oil", is substantially free of entrained solids; any remaining particles are then removed by conventional means, such as centrifuging or electronic separation. These known methods for removal of solids provide hydrotreating charge containing as little as 500 ppm fines or less.

In some cases, it may be desirable to subject the hydrocarbon product to a hydrocracking treatment. This form of high severity hydrotreating simultaneously induces molecular conversion, desulfurization and denitrification. It is carried out at much higher pressures than a standard hydrotreating process as used to saturate double bonds in the hydrocarbon product, and generally requires a significantly greater hydrogen input as well. Material which is to be hydrocracked should also be subjected to a preliminary treatment to remove substantially all of the fines.

Yet another method for production of useful hydrocarbon products from the selective vaporization product is vacuum distillation in a so-called "vacuum tower." The bottoms from the tower, generally comprising materials boiling above 1000° F., may be used to prepare heavy fuel oil, such as Bunker C and No. 6 oils. The fraction boiling at 600°–1000° F. can be subjected to conventional hydrotreating for further upgrading, or catalytic cracking to prepare high octane products.

2. The Contact Material

Kaolin clays are naturally-occuring hydrated aluminum silicates of the approximate formula $Al_2O_3.2SiO_2.XH_2O$, wherein X is usually 2. Kaolinite, nacrite, dickite and halloysite are species of minerals in the kaolin clay group. It is well known that when kaolin clay is heated in air that a first transition occurs at about 500° C. associated with an endothermic dehydroxylation reaction. The resulting material is generally referred to as metakaolin. Metakaolin persists until the material is heated to about 975° C. and begins to undergo an exothermic reaction. This material is frequently described as kaolin which has undergone the characteristic exothermic reaction. Some authorities refer to this material as defect aluminum-silicon spinel or as a gamma lumina phase. See Donald W. Breck, ZEOLITE MOLECULAR SIEVES, published by John Wiley & Sons, 1974, pages 314–315. On further heating to about 1050° C., mullite begins to form. The mullitization reaction that takes place when kaolin clay is utilized as the sole source of silica and alumina may be represented by the following equation where the approximate chemical formula for kaolin (without the water of hydration) is given as $Al_2O_3.2SiO_2$, and the formula for mullite is $3Al_2O_3.2SiO_2$:

$$3(Al_2O_3.2SiO_2) \rightarrow 3Al_2O_3.2SiO_2 + 4SiO_2.$$

The term represented by $4SiO_2$ is the free silica generated as a result of the conversion to mullite. The extent of conversion to mullite is dependent on a time-temperature relationship and the presence of mineralizers, as is well known in the art. The free silica can be amorphous or crystalline and this will also depend on calcination temperature and time and the presence of mineralizers. A high purity kaolin clay can theoretically be converted into about 64% mullite on a weight basis. The free silica formed when high purity kaolin clay is thermally converted into mullite is amorphous when calcination takes place at about 1100° C. Upon heating to temperatures in excess of about 1260° C. silica crystallizes and the amount of silica detectable by X-ray increases with temperature and time. The crystalline silica may be tridymite or cristobalite or both.

It is also well known that the reactivity of kaolin clay changes as it undergoes these thermal transitions. See the Breck publication supra at page 315. Alumina in metakaolin is quite soluble in mineral acids. Solubility decreases when the clay undergoes the exotherm and the material is substantially insoluble when the clay passes through the exotherm unless the calcined clay undergoes chemical reaction with metals such as those found in bitumen.

The particles of acid-resistant contact material are composed of an acid-insoluble form of alumina such as alpha-alumina, crystalline silica such as sand, silica-alumina, or mixtures thereof. Mixtures of acid-resistant contact material may be employed, such mixtures including those in which particles of crystalline silica derived from tar sand bitumen are present. Preferred contact material is composed of kaolin clay previously calcined at a temperature and for a time at least such that the clay passes through the characteristic exothermic reaction. An especially preferred invention embodiment of this utilizes particulate contact material characterized by the presence of both mullite and free silica (silica in addition to the silica content of the mullite component), an appreciable amount of the free silica being present in crystalline form (tridymite, cristobalite or both). Such material may be obtained by calcining kaolin clay or kyanite at a temperature above that required to cause the clay to undergo the exotherm. The contact particles may also contain small amounts of alumina not present in mullite, such alumina being a crystalline form resistant to acid such as alpha alumina.

Most preferably the contact material containing both mullite and free crystalline silica is in the form of spray dried microspheres, as contrasted to particles obtained by calcining ores such as kaolin or kyanite to form aggregates of mullite and crystalline silica which are then ground and sized to a particle size distribution suitable for fluidization.

Use of the mullite-crystalline silica microspheres is also advantageous because ash can be selectively removed from the contact material without consuming extra acid in the undesirable leaching of components of the contact material (especially alumina) which would have the additional draw back of imparting cracking activity to the contact material. While it is technically feasible to reduce surface area and cracking activity to acceptable levels by calcining particles of contact material after acid treatment, such treatment will add to processing costs. Consequently, these microspheres can be treated with a strong mineral acid for effective dissolution of deposited mineral mater as well as deposited metals without changing the composition and properties of the contact particles.

The especially preferred embodiment of the instant invention which utilizes as contact material consisting of mullite and crystalline silica had its genesis in part in attempts to provide cost-effective technology to remove deposited metals, notably nickel and vanadium, from spent contact material that is withdrawn periodically from selective vaporization units operating with resid feedstocks or highly metal contaminated petroleum crudes and is replaced by fresh material. Early attempts to remove large amounts of both vanadium and nickel using acid extraction were plagued by co-extraction of significant amounts of alumina from contact material formed by calcining microspheres of kaolin clay through the exotherm. Removal of alumina in more than minimal amounts resulted in an undesirable increase in surface area. Those knowledgeable in the art of catalytic cracking are aware that increases in surface area are generally associated with increased catalytic cracking activity which is undesirable in a selective vaporization process. Also, when removal of appreciable amounts of alumina took place, the attrition-resistance of the microspheres decreased or, in some cases, the microsphere-form was actually destroyed. In either case, the metal-depleted (extracted) microspheres would be of limited, if any, use as a substitute in whole or in part for fresh charge of contact material. In addition to the aforementioned problems, the presence of alumina in the acid leachate resulted in difficulties in bringing about the subsequent separate recovery of nickel and vanadium from the leachate.

Contemporaneously with investigations directed to provide contact materials which responded satisfactorily to simple acid extraction for metals removal, attempts were also made to develop contact material that would be more resistant to agglomeration when used in a selective vaporization process. The efforts were thwarted by the unexpected finding that increases in porosity did not necessarily result in decreases in tendency to agglomerate. To the contrary, it was found that some material meeting the criterion for resistance to agglomeration were very low in total porosity. Some materials exhibited promising performance with regard to agglomeration resistance after one or two acid regeneration treatments but disintegrated physically when they were subjected to additional cycles of metal loading and regeneration by acid extraction.

The resolution of these seemingly unrelated problems merged with the unexpected discovery that by providing alumina-silica contact material composed predominantly of mullite and crystalline silica, both problems were fortuitously solved. This was unexpected because the materials that formed the basis for these discoveries had very low porosity, less than 0.1 cc/g. Substantially all of the porosity was contributed by macro-sized pores, i.e., pores having diameters larger than 1000 Angstrom units. We do not wish to be bound to any theory of hypothesis regarding the multiple benefits achievable by providing contact particles composed predominantly of crystalline mullite and crystalline silica. It is believed that such contact particles minimize agglomeration because they contain little if any silica that is not contained in crystalline form, i.e., mullite and crystalline silica. Consequently, less silica is available in chemically reactive form. Since the predominating components of the binding agent in agglomerates is believed to be mainly silica, sodium and vanadium rich crystalline phases, less binding material will be formed under the hydrothermal condition prevailing in a selective vaporization burner. We also believe that by reducing the content of reactive silica, less vanadium and nickel occur as silicate compounds or complexes which are difficult to dissolve with strong mineral acids. Consequently, a greater fraction of both metals can be removed by acid extraction.

To prepare the especially preferred novel contact material in the form of microspheres, clay thermally convertible to mullite and free silica such as high purity kaolin clay (or kyanite, which is also convertible to mullite and silica) is first mixed with a fugitive binder, preferably water, and formed into particles of desired size and shape, preferably microspheres formed by spray drying. The resulting preforms are then fired (calcined) under conditions of time and temperature conducive to substantial conversion to mullite and also sufficient to convert silica resulting from the decomposition of clay or kyanite into an appreciable level of crystalline silica.

Clay or kyanite to be processed into mullite/crystalline silica should be high in purity. Generally these minerals should be low in iron, titania, alkalies, and free alumina. Typically, the material should contain at least 95% by weight (volatile free basis) of silica plus alumina. Presently preferred are high purity, water-washed kaolinitic clays from deposits of the type found in Georgia, such clays typically having a $SiO_2/Al_2O_3$ molar ratio of about 2/1, and containing, on a volatile-free weight basis, less than 2% iron (measured as $Fe_2O_3$) and less than 1% total alkali and alkaline earth oxides. Many clays, for example, the smectites (e.g., bentonites), attapulgites, and illites are high in alkaline earth and alkali and some clays and kyanites contain high levels of iron e.g., more than 3% expressed as $Fe_2O_3$ on a volatile-free weight basis. Georgia kaolins of both the hard and soft types have been used successfully.

The term hard clay as used in this specification and in the claims, means kaolin clays such as the sedimentary clays mined in the middle and east Georgia kaolin districts. These clays are distinguished from the more commonly known and used soft kaolin clays in a number of ways as summarized, for example, in table form at page 29 of "Field Conference, Kaolin, Bauxite, Fuller's Earth, Annual Meeting of the Clay Minerals Society, 1979", the disclosure of which is incorporated by reference herein.

Hard and soft kaolin clays are also distinguished from each other in Grim's "Applied Clay Mineralogy", 1962, McGraw-Hill Book Company, Inc., at pages 394 to 398 thereof, the disclosure of which is incorporated by reference herein. As mentioned in the Grim publication, hard kaolins are generally darker than soft kaolines. The Grim test also points out that the ultimate size of particles, i.e., the size of the particles in a well-dispersed clay pulp, of hard kaolin clays is significantly finer than those of soft kaolin clays. As described in the Grim test, a representative sample of hard kaolin clay had about 90% by weight of the ultimate size particles finer than 2 microns and about 60% by weight finer than ½ micron, the average particle size of typical hard clays being below ½ micron. Soft kaolin crude clays in contrast, contain a substantial amount of particles coarser than 2 microns, with the average particle size of a representative papermaking soft kaoline clay being about 1 micron, with only a minor amount fiber than ½ microns. Such particles generally differ from the finer particles in that the former are composed of a substantial proportion of stacks or booklets of hexagonal clay crystals. Still other stated differences in the Grim test between hard and soft clays are that hard kaolin clays tend to be less ordered (less well crystallized) than soft kaolin clays which tehrefore produce more sharply defined X-ray diffraction peaks, and the hard kaolin clays absorb less water than do soft kaolin clays.

The particle size distribution of the clay and its degree of agglomeration in the green bodies (i.e., the bodies obtained after forming into particles and prior to calcination) influence the hardness and structure of the calcined bodies. However, too much macroporosity may reduce the strength and attrition resistance of mullite/crystalline bodies. Therefore, the particle size and degree of agglomeration of clay used to produce crystalline/silica mullite particles is a compromise between maximum strength (i.e., minimum porosity) and some macroporosity. Clays with broad particle size distributions generally produce minimum porosity. An example of such a clay is ASP® 900 hydrous kaolin, which contains particles up to 20 microns in diameter, an average particle size (weight basis) of ca. 1.5 microns, and about 25% by weight finer than 0.5 micron. Clays with a narrower particle size distribution do not pack an efficiently as clays having a broader particle size distribution, resulting in a greater quantity of macroporosity. An example of such a clay is ASP® 400 hydrous kaolin, which contains particles up to 20 microns in diameter, an average particle size of ca. 5 microns and nothing<0.5 micron. A good compromise between these extremes, which results in less than about 0.1 cc/g of macroporosity in microspheres after calcination, is ASP® 600 hydrous kaolin which contains nothing coarser than about 8 microns, has an average particle size of 0.9 micron and contains 35%<0.5 micron. (As used herein, all particle sizes of hydrous clays in the micron-size range are those determined by sedimentation and are therefore expressed as "equivalent spherical diameter" or "e.s.d." in conventional manner.)

A preferred source of hard clay is the coarse size fraction of a hard kaolin crude that is produced as a waste by-product stream in the commercial production of calcined low abrasion clay pigments from hard clay as described in U.S. Pat. No. 3,586,523 to Fanselow et al. This by-product stream arises when degritted hard clay crude is processed in centrifuges to recover a fine size fraction, typically 90% by weight finer than 1 micron, for subsequent charge to a calciner. Use of this by-product stream results in the utilization of virtually all of the degritted hard clay crude. Thus, the fine particle size fraction is employed to manufacture a high value calcined clay pigment having low abrasion. The pigment is substantially free of mullite. The remainder is employed to manufacture mullite/crystalline silica contact material.

While the especially preferred bodies contain mullite and crystalline silica as essential components, it is possible to produce bodies in which other substantially acid insoluble ingredients are also present. Examples of material which are acid insoluble are certain crystalline forms of alumina, zirconia and silica. The source of added acid insoluble alumina, zirconia or silica can be a material which is normally acid soluble but is converted to a substantially acid insoluble form when the bodies are calcined. For example, alumina may be added as hydrous (soluble) alumina but will be converted to acid-insoluble form during calcination. Acid solubility is determined by refluxing the solid bodies with 35% $H_2SO_4$ solution for 1 hour using a weight ratio of 3 parts by weight acid solution to 1 part by weight of the solid bodies. When used as an ingredient in making the contact particles, alumina should be employed in a minor amount relative to the amount of clay. When alumina was mixed with kaolin clay in amount in excess of 15 parts by weight clay to 85 parts by weight clay to form microspheres, which are then calcined at 1115° C. to 1370° C., the resulting contact material agglomerated excessively. Microspheres which contained higher levels of added alumina (i.e., alumina added to clay in amounts of 45 to 75 parts by weight alumina to 55 to 25 parts by weight clay) had acceptable agglomeration performance when they were calcined at 1260° C. However, attrition resistance was impaired and progressively decreased when the level of alumina addition increased. Consequently, contact materials containing high levels of added alumina may be too soft or they may disintegrate during acid leaching. However, whether or not small amounts of alumina or other acid insolubles are also present, the bodies should contain no more than about 3%–5% by weight of combined oxides of alkali, alkaline earth and iron which may impair agglomeration resistance when present in excessive amount.

Forming can be conducted by conventional processes known in the art. Microspheres can be formed by spray drying a slurry of clay in water. In addition, a fugitive binder, such as polyvinyl alcohol, may be added to the slurry prior to spray drying to impart additional strength to the green microspheres prior to calcination. The preferred method to form microspheres is to prepare a slurry containing about 65 wt % of finely-divided, high purity hydous kaolin clay (e.g., ASP® 600 clay), 0.3 wt % tetrasodium pyrophosphate, based on the weight of the clay, and water; and to spray dry the slurry using a spray dryer operating with a gas inlet temperature of about 540° C. and an outlet temperature of about 120° C. This results in microspheres which, prior to calcination, are typically characterized by 0.25 cc/g of macroporosity and essentially no meso- or microporosity. Particle size of the microspheres is in the range of about 20 to 150 microns. Average size is typically 60 to 90 microns.

Control of calcination conditions (time and temperature) influence several properties, including:

1. the degree of clay conversion to mullite and free silica;
2. the conversion of free silica into required crystalline form;
3. the pore size, bulk density and surface area of the mullite/crystalline silica product.

Useful calcining temperatures are those which give conversion of clays to mullite plus free crystalline silica in practically useful times. Calcination temperature, using a specific piece of calcination equipment operating with a given residence time, will vary with the nature of the clay in the particles. This is demonstrated by data to illustrative examples which indicate that lower temperatures may be used with hard clay than with soft clay. Impurities in hard clay which act as fluxes may be responsible. Suitable calcination temperatures and time in conventional laboratory scale muffle furnaces are shown in illustrative examples. The temperature-time relationship has been found to vary using different muffle furnaces. Results have been found to vary with the furnace used to calcine the particles. We believe that rotary calciners of the type described in U.S. Pat. No. 3,383,438 (Puskar et al) are suitable. However, such rotary calciners should be operated at temperatures above those mentioned in the '438 patent since the process described therein in intended to produce low abrasion calcined clay pigments which should be substantially free from mullite. Multiple hearth furnaces are also suitable. We believe that it is feasible to employ calciners in which the flame is not shielded from the particles undergoing calcination. Suitable conditions are readily determined for any given calciner. A suitable procedure is as follows. The theoretically achievable mullite content is calculated from the chemical composition of the green preformed particles. For example, using preformed microspheres consisting of high purity soft kaolin having a $SiO_2/Al_2O_3$ of 2.0, the maximum mullite content will be 64%. Using high purity kyanite, maximum mullite will be about 88%. The balance, in both cases will be free silica. X-ray patterns are obtained for samples calcined at various temperatures and times until the observed mullite content is close to the maximum theoretical mullite content. Generally, a mullite index above 50 should be obtained when calcining kaolin clay and an index above 45 when calcining kyanite. The progress of the development of crystalline silica can be followed by observing the height of the peak at d=4.11 Angstrom units. As mullite and crystalline silica phases develop, pore volume and surface area decrease and bulk density increases.

Representative microspherical contact material used in practice of the invention has a particle size distribution suitable for fluidization. Typically, average particle size is 60–90 microns. The particles should be substantially catalytically inert, i.e. the activity (conversion) should be below 20 and most preferably below 10 when tested by the MAT procedure. This procedure is described in European Patent Application 8410946.6. Bulk density is in the range of 1.10 to 1.5 g/cc. EAI is below 2%/sec., preferably below 1%/sec., and most preferably below 0.5%/sec.

Agglomeration of the metals and laden microspheres should be below 45, most preferably below 25, when determined by the test described hereinafter and expressed as Δmeans particle size or change in means particle size. When reflexed with 35% $H_2SO_4$ for 1 hours at a liquid/solids ratio of 3/1, the alumina content should be reduced by no more than 5% weight, preferably less than 3% by weight; the EAI of the microspheres should be substantially unchanged and the surface area should not increase above about 20 m$^2$/g. Surface area of fresh microspheres is 20 m$^2$/g or less, preferably lower and may be significantly less than 5 m$^2$/g, e.g., 1–3m$^2$/g. Preferably, more than 80% deposited vanadium and nickel should be amenable to removal by extraction. Most preferably, removal of Ni and V is greater than 90%. Also, after the microspheres are used and contain deposits of nickel and vanadium, more than 80% and, more preferably, more than 90% of the nickel and vanadium should be amenable to removal by the acid reflux treatment while resulting in reactivated microspheres having physical and performance properties substantially the same as those of the fresh microspheres. A possible exception is that the resulting reactivated microspheres can increase slightly in surface area, preferably not to values over 20 m$^2$/g. In the most preferred embodiment, the microspheres should be capable of undergoing repeated cycles, for example 3 or more cycles, of metal deposition, and reactivation by acid extraction of deposited metals to provide microspheres having physical and performance properties similar to those of the fresh microspheres.

3. The Acid Leach

A variety of acid leach procedures may be used to remove the ashes deposited mineral matter from the withdrawn contact material samples. The preferred acid leach procedures will remove at least about 40% by weight of the calcium oxide present of the surface of the materials. Typically, CaO and $TiO_2$ contents of up to about 3% can be tolerated. Iron oxide is easily removed, so most processes capable of reducing CaO and $TiO_2$ to the desired levels will also reduce iron to levels below about 1.5%, which is usually satisfactory.

The acid leach reactivation process shown in FIG. 2 is used to remove colloidal clay and, preferably, simultaneously to remove metals (nickel and vanadium) from spent contact material withdrawn from the burner of a selective vaporization unit and to produce reactivated contact material which is acceptable for reuse in the same or a different selective vaporization unit. The presently preferred process uses a high temperature mineral acid leach to remove deposited mineral matter and metals from the substrate material followed by filtration to separate the metals-containing solution from the contact material. The metals may be separated from the leachate and purified in separate processing steps and can be sold as by-products. Hydrochloric acid, nitric and sulfuric acid extraction at temperatures in excess of about 88° C. have been used with success.

Fresh makeup of substantially inert contact material in a selective vaporization unit is dependent on the quantity of contaminant metals in the feed as well as the desired metals loading on the contact material. As an example, a 350 ton inventory unit processing 50,000 barrels per day of a feedstock containing 150 ppm of Ni+V would require a withdrawal and loss rate of 42 tons per day in order to maintain a 3 wt % loading of Ni+V on the circulating contact material. Daily withdrawal and loss of contact material approximates the addition of fresh contact material. Metal laden microspheres withdrawn from the burner of a selective vaporization unit typically contain about 0.5 to 0.01 wt. % carbon. Vanadium may be $V^{+5}$ of $V^{+4}$ oxidation states or both. The oxidation state of vanadium will vary with the level of excess oxygen in the burner

4. Definition and Details of Test Procedures Used Herein Identification of Mullite Crystal Phase Using X-ray Powder Diffraction X-ray Powder Diffraction File, Card No. 15-776, Leonard G. Berry (Ed.), Joint Committee on Powder Diffraction Standards*, 1972 was used as the reference for the mullite X-ray powder diffraction pattern.
*1601 Park Lane, Swarthmore, Pa. 19081

Mullite index is measured by standard quantitative X-ray diffraction techniques relative to a nominally 100% mullite reference and using copper K-alpha radiation. A mullite index of 100 means that the mullite X-ray peak intensity for the peaks at 16, 33, 40, and 60 have intensities equal to the 100% mullite reference.

Identification of Tridymite and Cristobalite Crystal Phases using X-ray Diffraction It is well known that quantitative analyses of cristobalite or tridymite phases by X-ray diffraction are difficult because of the influences of crystal strain and lack of a suitable standard. Qualitative phase identification can be obtained for cristobalite (Card No. 11-695) and for tridymite (Card No. 18-1169 and Card No. 18-1170.)

Surface Area and Volume of Pores in Range of 20-100A

The surface area and the volume of pores having diameters in the range of 20-100A were determined by conventional nitrogen adsorption and desorption techniques, respectively, using a Micromeritics ® Digisorb 2500 Automatic Multi-Gas Surface Area and Pore Volume Analyzer. Before being tested for surface area and volume of pores having diameters in the range of 20-100A, the material being tested was first pretreated by heating under vacuum at about 250° C. for 16 hours.

Volume of Pores in Range of 100-20,000A

The volume of pores having diameters in the range of 100-20,000A was determined by a conventional mercury intrusion porosimetry technique using a scanning mercury porosimeter manufactured by Quantachrome Corp. The relationship between pore diameter and intrusion pressure was calculated using the Washburn equation and assuming a contact angle of 140° and a surface tension of 484 ergs/$cm^2$. Before being tested for volume of pores having diameters in the range of 100-20,000A, the materials being tested were pretreated by heating them in air to about 350° C. for one hour and then cooling them in a dessicator. The term total pore volume as used in the specification and claims refers to pore volume contained in pores with diameters in the range of 100-20,000 Angstrom units.

Micropores

Pores having diameters below 100A as determined by nitrogen porosimetry.

Mesopores

Pores having diameters in the range of 100 to 600A by mercury porosimetry.

Macropores

Pores having diameters in the range of 600 to 20,000A by mercury porosimetry.

Engelhard Attrition (EAI) Test

Preferably, the microspheres used in the ART process are hard enough so that they do not attrit at an excessively high rate in the selective vaporization unit. For example, the Engelhard Attrition Index (the "EAI") of the microspheres used in the process preferably should be less than 2%/sec. preferably less than 1%/sec. and most preferably less than 0.5%/sec. The EAI is determined by the procedure described in the publication entitled "Engelhard Attrition Index." A copy of this publication has been deposited at the Library of the Technical Information Center, Engelhard Corporation, Edison, N.J. 08818 (Dewey Decimal No. 665.533 EC/EAI). Access to this library, including this publication, can be obtained by writing to or telephoning the Manager of the Technical Information Center. In addition, a copy of this publication can be obtained by writing to: Director of Patents, Engelhard Corporation, Edison, N.J. 08818.

Bulk Density Determination

The apparent packing density or apparent bulk density of the formed particles was determined by a procedure essentially the same as that described in ASTM Method D-4164-82 except that 100 ml of sample was used and 1500 taps were employed.

Static Agglomeration Test

A procedure was developed for testing the agglomeration tendency of materials under conditions that simulate conditions experienced by contact materials in a selective vaporization process of the type disclosed herein. In general, this procedure involves examining the change in the particle size distribution of a sample after it is exposed to steam at high temperature.

More particularly, the procedure that was developed comprises the following steps:

(a) a sample is screened by vibrating it with a Rotap apparatus on a 70 mesh screen for 20 minutes;

(b) 25 grams of the −70 mesh fraction of the sample is weighted;

(c) the particle size distribution of the 25 gram sample is determined by vibrating it with a Rotap apparatus for one minute on a screen assembly comprising 70, 100, 140, 200 and 270 mesh screens;

(d) the 25 gram sample is then placed into a porous, Inconel basket (or another porous basket, e.g., a porous, alumina basket) and the basket, containing the sample, is put into a furnace where 100% steam is passed through it for 48 hours and at a temperature of 871° C.;

(e) the 25 gram sample is removed from the basket and its particle size distribution is determined using the procedure described in (c) above;

(f) the means and median particle size distributions of the 25 gram sample, before and after the steam treatment, are calculated, using the following formulas:

$$d\text{mean} = \frac{(w \cdot d)}{w}$$

$$d\text{median} = \text{antilog} \frac{[(w \cdot \log d)]}{w}$$

where dmean=mean particle size (in microns), dmedian=median particle size (in microns), w-weight of a particle size fraction, d=particle size, which is determined as shown below:

| Particle Size Fraction (Mesh) | Particle Size (Microns) |
|---|---|
| +70 | 250 |
| −70/+100 | 177 |
| −100/+140 | 125 |
| −140/+200 | 88 |
| −200/+270 | 63 |
| −270 | 44 |

(g) the difference between the mean and median particle sizes, before and after the steam treatment described in (d) above, are calculated by the following formulas:

$\Delta$mean=dmean after steaming−dmean before steaming $\Delta$median=dmedian after steaming−dmedian before steaming We believe that the values of $\Delta$mean and $\Delta$median for a material, which are obtained by the above procedure, provide a measure of the amount of agglomeration that will occur when that material is used in a selective vaporization process of the type described herein. In particular, we believe that materials having high $\Delta$mean and $\Delta$median values will exhibit a greater tendency to agglomerate in selective vaporization processes than will materials having lower $\Delta$mean and $\Delta$median values.

To determine the effect that the presence of vanadium has on the tendency of particles of contact material to agglomerate, different amounts of vanadium were deposited on samples. Then, those samples were tested to determine their $\Delta$mean and $\Delta$median values. Because nickel typically is also deposited on the particulate contact material used in selective vaporization processes of the type described herein, nickel was also deposited on the particles. Typically, samples are loaded with 8 wt % metals at a V/Ni weight ratio of 4/1.

Metal Impregnation Procedure

The metals-impregnation procedure used in some of the illustrative examples is carried out by contacting the clean microspheres with dilute aqueous solutions containing nickel nitrate (Ni(NO$_3$)$_2$.6H$_2$O) and ammonium metavanadate. Metals are applied to the microspheres in a V/Ni weight ratio of 4/1. An application of 9.16 grams of nickel nitrate in 35 ml of water and ten applications of 1.70 grams of ammonium metavanadate in 35 ml of hot water are used to impregnate 100 grams of clean microspheres with 6.4% V and 1.6% Ni. A batch of the clean microspheres are placed into a shallow pan; small portions of the aqueous solutions are added and mixed with the microspheres to form a paste. This paste is then dried in a convection oven at a temperature of 110° C. The resulting cake is broken-up into small chunks and more of the aqueous solution can then be applied. Because of the high solubility of nickel nitrate, the required amount of nickel can be loaded onto the microsphere with only one application of the solution; since the ammonium metavanadate has a very low solubility, many applications of this solution are needed to load vanadium at levels in excess of 0.76%.

The metals are dispersed among the microspheres in a series of conditioning steps. The metals-laden sample is first calcined at 593° C. in a muffle furnace for 1 hour and then steamed at 760° C. in a fluidized tube reactor for 4 hours. The steaming procedure for impregnated particles treated with 100% steam at 760° C. for 4 hours is described in Appendix A of the publication entitled "Engelhard Procedure for the Hydrothermal Deactivation of Fluid Catalytic Cracking Catalysts". This publication has been deposited at the Library of the Technical Information Center, Engelhard Corporation, Edison, N.J. 08818 (Dewey Decimal Number 665.533 (EC/H). Access to this Library, including this publication can be obtained by writing or telephoning to the Manager of the Technical Information Center. In addition, a copy of this publication can be obtained by writing to: Director of Patents, Engelhard Corporation, Edison, N.J. 08818. The sample is then passed through a 70 mesh screen during 20 minutes on a Ro-tap sifter apparatus; this screening not only breaks apart soft agglomerates, but also removes extraneous material such as clumps of metal salts. The sample is then ready for testing.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

The following examples, not to be construed as limiting, are given to further illustrate the invention.

EXAMPLE 1

This example demonstrates the desirability of removing fine mineral matter deposited on contact material from tar sands bitumen in a selective vaporization process prior to circulating the contact material to renewed contact with incoming charge of tar sand bitumen feedstock.

The contact material was prepared as follows:

ASP ® 600 kaolin clay (soft kaolin clay) was slurried at 60% solids in water containing 0.3%, based on the dry clay weight, of added tetrasodium pyrophosphate dispersant. The slurry was spray dried in a Bowen nozzle spray drier. Conditions were: inlet temperature of 300°-350° C.; outlet temperature of 120°-150° C.; rear pressure 80 psig; front pressure 25 psig; feed setting 0.2 relative. The microspheres were calcined in a rotary calciner to undergo the exotherm. Mullite index was 5. The average particle size of the microspheres was 75-85 microns in diameter.

Solvent-diluted tar sands bitumen were used in a selective vaporization process carried out in a conventional pilot plant FCC riser-regenerator system. The regeneration air was introduced through a fritted air distribution system; consequently, there was not provision to induce attrition and a ball milling action to remove colloids deposited on the contact material (microspheres of calcined kaolin clay) prior to recirculating contact material to the contactor. Thus, in the pilot plant tests, the deposited colloids were able to build up as a dense shell on the particles of contact material.

The properties of the bitumen prior to dilution with solvent are set forth in Table I. The chemical composition and particle size distribution of the mineral matter in the bitumen are detailed in Table II.

The chemical, physical and catalytic properties of the equilibrium bitumen contact material sample used to heat the bitumen are presented in Table III. For comparison purposes, representative values for fresh contact material are also included in the tables, along with representative values for equilibrium contact materials used in selective vaporization of heavy crude oil fractions having high levels of metals and Conradson Carbon.

Comparison of the chemical analyses (Table II and Table III) of the bitumen treated equilibrium contact material sample and the mineral matter in the bitumen concentrate clearly indicates that a large fraction of the mineral matter in the bitumen, especially iron, titanium, calcium and sulfur, has been incorporated into the microsphere sample. In addition, the surface area and micropore volume of the sample of contact material used to treat the bitumen were significantly higher than either fresh or equilibrium contact material which had been used for selective vaporization of residual fractions of petroleum (resid contact material sample). These changes in the physical and chemical nature of the sample are presumed to be responsible for its higher catalytic activity in MAT test results (Table IV). The high MAT conversion values for the bitumen treated contact material sample are from high yields of $C_3$ and $C_4$ (primarily olefins), and gasoline. The low yields of $C_1$ and $C_2$ and coke products suggests that the hydrocarbon products result from acid cracking rather than thermal cracking or metal dehydrogenation reactions. The high sulfur content on the regenerated bitumen contact material sample is also quite unusual. The sulfur is probably present as thermally stable sulfate compounds. The particle size distribution is typical of equilibrium selective vaporization contact materials (low levels of $-40$ micron material).

Several representative SEM photographs were taken, and EDX (energy dispersive x-ray) analyses of the bitumen sample contact material are presented in Table V. Only clay-based microspheres were present. Apparently the deposited mineral material was so fine that no large (50-70 micron) particles were formed. The surface roughness, protrusions and irregularly-shaped particles which were observed on the microspheres surfaces are very unusual for an equilibrium contact material and have not been observed in samples used to treat residual oils. The close match of the chemical properties of the surface particles on the microspheres and the fine mineral matter in the bitumen clearly indicates that the fine mineral matter in the bitumen had deposited on the exterior surfaces of the contact material during the selective vaporization process operation.

From particle size data in TABLE II, it can be seen that the average particle size of the mineral matter in the bitumen concentrate was 9 microns and about 10-20% by weight was larger than 80 microns. Thus, in the sample of tar sands bitumen used in this test a portion of coarser mineral matter (sands) had been removed during processing the raw tar sands. TABLE IX shows chemical analyses of what is understood to be typical of coarse sand removed during beneficiation of raw tar sands. The data indicate that the coarse material was predominantly silica with a mean particle size of about 180 microns.

EXAMPLE 2

This example demonstrates the use of various acid leach treatments to remove deposited mineral matter from calcined clay contact material. Table VI summarizes the results of several acid leach procedures on portions of the equilibrium bitumen contact material sample obtained by calcining kaolin clay to undergo the exotherm without substantial mullite formation (Example 1). The acid treated samples show significant reductions in the levels of the various contaminants (iron oxide, titanium dioxide, calcium oxide, nickel and vanadium) that accumulated on the equilibrium contact material during the tar sands bitumen processing. The extents of extraction of the various contaminants are functions of the type and concentration of the various mineral acids used in these experiments.

Chemical analyses of the alumina content of the leach solutions and calculations based on data in Table VI show that all acid leach treatments decreased the $Al_2O_3/SiO_2$ ratio of the remaining solid, thus indicating removal of some alumina from the contact material and/or the deposited solid.

Table VII summarizes the catalytic activity of these samples after the acid leach, but before calcination. Table VIII summarizes the reduction in surface area observed with these samples after calcination. These results indicate that it may be necessary to calcine or steam contact material produced by calcining clay to undergo the exotherm without substantial mullite formation after acid leach to remove deposited mineral matter in order to generate material reusable in selective vaporizations. Temperatures of 1200° F. or higher are indicated.

EXAMPLE 3

The test work described in this example suggests that selective-attrition will be effective for removal of mineral contaminants deposited on contact material during the upgrading of mineral contaminated tar sand bitumen by selective vaporization.

A sample of the equilibrium calcined kaoline clay contact material used in the pilot plant test run of Example 1 was subjected to attrition to determine whether deposited mineral matter could be selectively attrited from the microspheres of calcined kaolin clay. As shown in Table III, the fresh contact material (microspheres of calcined kaolin clay) analyzed approximately 45 wt % $Al_2O_3$, 52 wt % $SiO_2$, 2 wt % $TiO_2$, less than 1% iron oxide and negligible calcium. The analysis of the equilibrium contact material including deposit of mineral matter also appears in Table III under the legend "Bitumen Contact Material Sample" and shows appreciably higher levels of iron, titanium and calcium than were present in the contact material.

Since the run in which the mineral matter was deposited on contact material was carried out in a pilot unit not equipped with means to attempt to continuously attrite the mineral deposit during regeneration of the contact material, the effort to determine the response of the equilibrium material to a high velocity air jet was carried out in a Roller Attrition test unit. This Roller attrition test is well known in the FCC industry where it is used to determine the attrition resistance of samples of fluid cracking catalyst. The Roller test applies a high velocity air jet to a sample located in a U-tube below a cyclone. After the application of the high velocity air, the attrited material which passed through the cyclone is collected in a filter. In this example, the attrited material was recovered and analyzed by SEM/EDX techniques, in sufficient material being available for complete chemical analysis or to make a material balance.

The attrited material was found to consist of two general types of particles, i.e., shell pieces of the order of about 10 microns or less in size and fine dust. SEM analysis of the microspheres remaining after removal of attrited material in the Roller unit showed evidence of cracking and partial removal of the shell. The chemical compositions of the attrited components, expressed as oxides, are set forth below:

| wt. % | Shell Pieces | Fine Dust |
|---|---|---|
| $Na_2O$ | — | 0.44 |
| MgO | 4.95 | — |
| $Al_2O_3$ | 13.83 | 37.93 |
| $SiO_2$ | 23.87 | 51.36 |
| $P_2O_5$ | 5.09 | 1.16 |
| $SO_3$ | 4.35 | 0.76 |
| Cl | 0.14 | — |
| $K_2O$ | 0.63 | 0.57 |
| CaO | 20.27 | 2.94 |
| $TiO_2$ | 11.16 | 2.79 |
| $Fe_2O_3$ | 15.70 | 2.05 |

EXAMPLE 4

A Utah, U.S.A. tar sand bitumen has been treated in a selective vaporization process unit pilot plant to produce an upgraded synthetic crude. The contact material was composed of calcined kaolin clay and was similar to the material described in Example 1.

The extremely heavy bitumen material had an API of 9.3° and contained 1.2 wt % mineral matter.

The Table presented below summarizes expected commercial unit yields based on calculations from results of pilot plant tests adjusted for heat balance and providing for continual removal by acid treatment and/or attrition of deposited mineral matter.

| TAR SAND BITUMEN YIELDS | |
|---|---|
| $C_2-$ | 3.2 |
| LPG | 2.7 |
| $C_5$–205° C. ($C_5$–400° F.) | 14.1 |
| 205° C.–345° C. (400–650° F.) | 10.8 |
| 345° C.+ (650° F.+) | 56.4 |
| COKE | 12.8 |

To illustrate the dramatic change in boiling range which took place in processing of this tar sand bitumen we have illustrated in FIG. 3 the distillation curves of the synthetic crude product and the bitumen feedstock. FIG. 3 shows estimated true boiling point distillation and API gravity curves of the products and feedstock (distillation only). Most interestingly the bitumen feedstock had an initial boiling point of about 482° C. (900° F.). The synthetic crude was substantially lighter, 70 Vol. % of which boiled below the initial boiling point of the bitumen feedstock. Very important was the fact that the 565° C.+ (1050° F.+) portion of the synthetic crude amounted to only 12 Vol. % of the synthetic crude oil. This fraction, corresponding to vacuum residum, comprised about 92 Vol. % of the bitumen feedstock. In fact, comparing the synthetic crude oil which would be produced from the bitumen with heavy Arabian crude oil indicates that the synthetic crude, being of much lower contaminant content and having much more distillate range material, could be of a significantly higher value.

EXAMPLE 5

This example illustrates the preparation of low pore volume, macroporous fluidizable microspheres of mullite/crystalline silica from hard and soft kaolin clays and suggests that both types of clays can provide contact materials capable of being reactivated with boiling sulfuric acid for removal of deposited nickel and vanadium at levels of about 80% without substantial coextraction of alumina. For practical reasons the metals were deposited from aqueous solutions and not during test runs (as in Example 1) in which metals and colloidal clay were deposited during contact with bitumen. The example further illustrates how calcination conditions alter the physical properties and response to extraction of nickel and vanadium.

ASP ® 600 kaolin clay (soft kaolin clay) was slurried at 60% solids in water containing 0.3%, based on the dry clay weight, of added tetrasodium pyrophosphate dispersant. The slurry was spray dried in a Bowen nozzle spray drier. Conditions were: inlet temperature of 300°–350° C.; outlet temperature of 120°–150° C.; rear pressure 80 psig; front pressure 25 psig; feed setting 0.2 relative.

Portions of the microspheres were calcined at temperatures between 1149° C. and 1371° C. for 2 hours in a muffle (Harrop) furnace. During calcination, the microspheres were contained in cordierite trays which were left uncovered during calcination.

The procedure was repeated with a composite of coarse reject fractions of hard Georgia clay known as Dixie clay. The coarse fractions were obtained from a plant as follows. Crude Dixie clay was blunged in water, degritted to remove plus 325 mesh oversize, and fractionated in a commercial Bird centrifuge, in conventional manner, to recover a fine particle size fraction, approximately 90% finer than 1 micron as centrifuge overflow products. The underflow products containing the so-called "coarse rejects" were combined, screened to remove 325 mesh particles; portions of the screened suspensions were centrifuged in a pilot scale Bird centrifuge to recover a fine size fraction which was about 78% by weight finer than 2 microns and had an average particle size of about 0.4 microns. The suspensions were flocced with sulfuric acid, filtered and redispersed at about 60% solids with tetrasodium pyrophosphate prior to spray drying as described above. Portions of the spray dried microspheres were calcined as described above.

Properties of the calcined microspheres from ASP 600 clay and Dixie clay were reported in Table X.

The resulting calcined microspheres were then impregnated with 3% (wt.) metals (2.4% V and 0.6% Ni) and then treated with mineral acids to remove metals. Since metals were deposited from aqueous liquids colloidal ash was not co-deposited.

The typical laboratory reactivation procedure consisted of weighing 50 gms of metal laden microspheres into a 100 ml round bottom flask which contained 85 gms of 35% (wt.) $H_2SO_4$ (liquid/solid ratio of 1.7) and a magnetic stirring bar (2.5 cm length). The flask was connected to a reflux condenser and heated by means of a heating mantle to boiling. The time of leaching was measured from the onset of refluxing and typically was one hour. The slurry was stirred at the minimum speed necessary to prevent settling of the microspheres. After one hour the slurry was filtered on a medium porosity sintered glass funnel and the solids were rinsed twice with about twenty milliliters of deionized water. The reactivated microspheres were oven dried (110° C.) and subjected to analysis of the various physical properties and their residual nickel and vanadium levels.

For purposes of comparison, commercial contact material was impregnated with metals and then reactivated. This material was prepared by calcining microspheres of soft Georgia kaolin clay to undergo the exotherm and had a mullite index of 5 (Sample A). For further purposes of comparison, commercial contact material also made from soft clay but calcined to mullite index of 39 (Sample B) was also tested for reactivation. Physical properties of microspheres before and after sulfuric acid reactivation are shown in Table XI (Dixie clay) and Table XII (ASP 600 clay).

Metals analyses and physical properties of reactivated microspheres were measured after acid extraction in order to determine both the effectiveness of nickel and vanadium removal and possible changes in properties of the resulting reactivated microspheres that might make them unsuitable to reuse in an ART unit. The nickel and vanadium extraction results of microspheres obtained from Dixie clay and ASP 600 clay are shown in Tables XIII and XIV.

It was found that nickel was poorly extracted (20%) from commercial contact material (control A) by refluxing 35% sulfuric acid while vanadium extraction was fairly good (63%). Extraction of vanadium and nickel from the other commercial sample (control B) was better (75% Ni and 80% V). See Table XV. The data for experimental samples obtained by calcining microspheres of ASP 600 clay and hard clay show that nickel extraction increases rapidly with calcination temperature over the range of 1093°–1260° C. and then more slowly between 1260° C. and 1371° C. Vanadium extraction from soft clay microspheres showed virtually a linear increase with rising calcination temperature whereas the hard clay microspheres exhibited a much greater extraction increase between 1204° C. and 1260° C. calcination temperatures.

The microspheres having 39 mullite index (control B) exhibited metal extraction performance corresponding to calcination temperatures between 1204° C. and 1260° C. Furthermore, the physical properties of this contact material was comparable to those of ASP 600 clay microspheres prepared by laboratory calcination at 1204° C.

The data indicate that calcination temperatures in excess of 1260° C. and 1316° C. are required for hard clay and soft clay microspheres, respectively, to attain >80% metals extraction.

EXAMPLE 6

Samples of ASP 600 kaolin that had been spray dried and calcined in a muffle furnace at bed temperatures of 1149° C. to 1371° C. were used in tests to determine which calcined microspheres met the following desired performance criteria related to use in a selective vaporization unit EAI<0.5%/sec., leachability of impregnated Ni+V>80% (Ni+V) with 35% $H_2SO_4$ under reflux conditions and resistance to agglomeration by the static agglomeration test below 25. The results are summarized in Table XV along with some properties. In the agglomeration testing, metals were loaded to total metals level of 8% in order to provide a means to descriminate between samples. In the leaching tests, metals were loaded at 3% total. Calcined microspheres with superior agglomeration performance, e.g., less than 25, also produced excellent metal extraction results, i.e., greater 85% of both nickel and vanadium removed.

EXAMPLE 7

A sample of raw (uncalcined) high purity kyanite was obtained from Virginia Kyanite Co. The sample as received had the following composition:

| | |
|---|---|
| L. O. I. - 0.34% | $TiO_2$ - 0.93% |
| $Al_2O_3$ - 57.93% | CaO - 0.02% |
| $SiO_2$ - 40.69% | MgO - 0.04% |
| $Fe_2O_3$ - 1.0% | $Na_2O$ - 0.09% |
| $K_2O$ - 0.02% | | and was about 90% <325 mesh.

This material was ball milled 20 hours at 60% solids with 0.3% Calgon T dispersant added; Agates were used as the grinding media at 5.6 times weight of kyanite. The solids in the resultant slurry, pH 7.5, had a particle size distribution as below:

| | |
|---|---|
| 85% < 4 u | 35 < 1 u |
| 77% < 3 u | 60 < 2 u |

The sample was spray dried with approximately 50% loss. Furthermore, the recovered product did not have the appearance of microspheres.

A second preparation was made as above except sodium silicate was added as binder to spray drier feed. The addition level for "N ®" Brand sodium silicate was 1% based on the weight of the kyanite. The spray drier product was calcined at two temperatures as below:

| Calcination Temp. (Pereny Furnace) | 1149° C. | 1260° C. |
|---|---|---|
| Time at Temp. | 1 hour | 1 hour |
| Product | | |
| Hg Pore Volume (cc/g) | 0.202 | 0.22 |
| BET Surface Area ($N_2$) ($m^2$/g) | 2.1 | 1.9 |
| Mullite Index | not meaningful - interfering peaks | 59 |
| EAI (%/sec.) | 0.58 | 0.76 |
| Av. Particle Size (microns) | 88 | 70 |

The sample calcined at 1260° C. was impregnated with 0.6% Ni, 2.4% V by the aqueous impregnation procedure, followed by steaming at 760° C., 4 hours. The sample was extracted with refluxing 20% $H_2SO_4$ for 1 hour (liquid/solid weight ratio of 2/1) to yield 92.5% nickel removal and 91.8% vanadium removal but only 0.9% $Al_2O_3$ coextraction (based on the $Al_2O_3$ content of the microspheres.)

Larger quantities of calcined kyanite from the above spray drier batch were prepared with the following properties.

| Calcination Temp. (Harrop Furnace) | 1038° C. | 1149° C. |
|---|---|---|
| Time at Temp. | 1 hour | 1 hour |
| Hg Pore Volume (cc/gm) | 0.26 | 0.23 |
| Mullite Index | (not meaningful - interfering peaks) | |
| EAI (%/sec.) | 3.3 | 1.0 |

These samples were evaluated for agglomeration. When loaded to 3% metals both samples agglomerated severely.

A third preparation of kyanite microspheres was prepared by first fluid energy milling the raw material. This was done in a pilot plant fluid energy mill at the following settings:
High pressure steam—110–125 psig
Super Heaters—315° C. on both
Feed Rate—32#/Hour
Feed Pressure—80–90 psig
Grind Pressure—75–85 psig The fluid energy milled product was subsequently ball milled 20 hours, as before, to yield a slurry of average particle size 1.5 microns. The ball mill product was treated with "N" Brand sodium silicate (3% based on kyanite weight) and spray dried. The spray drier settings were:
Slurry Feed Rate—0.2 relative
Slurry Feed Pressure—35 psig
Air Pressure—80 psig
Inlet Temp.—177° C.
Outlet Temp.—52°–57° C.

The spray drier product was calcined to the Harrop furnace to give the following properties:

| Calcination Temp. | 1260° C. |
|---|---|
| Time at Temp. | 1 hour |
| Hg P. Volume (cc/gm) | 0.27 |
| BET Surface Area ($m^2$/g) | 1.5 |
| EAI (%/sec.) | 1.4 |

Larger quantities of calcined kyanite were prepared for agglomeration evaluation. These samples were prepared from microspheres prepared using 3% sodium silicate binder. The only differences between these samples and the previous ones were the increased residence time in the furnace and the higher level of sodium silicate added as binder. Portions of the calcined microspheres were tested for physical properties. Others were impregnated by the water impregnation technique described above to a total metal loading of 5% and tested for agglomeration performance. Results are summarized below:

| | Kyanite Microspheres | | |
|---|---|---|---|
| Calcination Conditions (°C./Hours) | 1148° C./2 | 1260° C./2 | 1371° C./2 |
| Agglomeration, 5% metals | | | |
| Δmean (micron) | 69.3 | 4.9 | 5.7 |
| Δmedian (micron) | 54.7 | 4.9 | 5.5 |
| Physical Properties, Clean Microspheres | | | |
| Mullite index | 0* | 47 | 74 |
| Hg Pore Volume, cc/g | 0.2667 | 0.2713 | 0.2834 |
| Mean Pore Radius, Angstrom | 3500 | 4400 | 5300 |
| Surface Area, $m^2$/g | 2.0 | 1.7 | 1.3 |

*Interfering Peaks - value may not be meaningful.

EXAMPLE 8

This example illustrates the preparation of fluidizable microspherical contact material from mixtures of high purity kaolin clay with various calcined and hydrous aluminas. The clay materials used were ASP 600 kaolin clay, described above, and hard kaolin clay having a nominal particle size of about 80% minus 2 microns and prepared, as described above, by centrifuging a degritted waste stream of coarse particle size fraction of hard clay and recovering the fine size fraction. The aluminas were Alcoa A-3 alumina (calcined alumina); and FGA (fusion grade calcined alumina) and TGA, (transition grade alumina) aluminas obtained from Reynolds Metals Company. The proportion of aluminas mixed with clay was varied, ranging from about 15 to 75 parts by weight alumina (anhydrous basis) to 100 parts by weight total mixture (dry weight basis).

The procedure for preparing contact material composed of clay-alumina blends was as follows. An amount of tetrasodium pyrophosphate corresponding to 0.5 wt % of the clay component of the blends was added to water. The pH of the solution of tetrasodium pyrophosphate, initially about 9.8, was then adjusted to 7.0 by addition of concentrated phosphoric acid. Mixtures of clay and alumina were added to the resulting solution in amounts calculated to produce 60% solids slurries. Slurry makedown was performed in a Cowles mixer. The slurries were then spray dried in a Stork-Bowen spray dryer. The operating conditions of the spray dryer were: inlet temperature 250°–260° C., outlet temperature 110°–120° C., nozzle pressure 35 psig, and pressure drop 6–7 in. of water. Five hundred (500)g of each sample was calcined in the Harrop furnace at two different temperatures (1260° C. and 1371° C.) for two hours.

Physical properties were measured and some calcined microspheres were impregnated with metals and tested for extractability with acid and agglomeration. These results are presented in Table XVI. X-ray diffraction patterns indicated that little if any mullite formed beyond that expected from the clay component even with the 1371° C. calcination treatment.

It will be understood that the term fine mineral matter as used in the specification and claims refers to particles that are about 10 microns of finer. The methods for measuring particles of such size involve sedimentation and there are some differences normally encountered in making measurements even when the same equipment (e.g., MICROTRAC ® analyzer) is used. For example, a particle may be produced as having a size of 10 microns (equivalent spherical diameter) but others using the same equipment may report values as high as 15 microns or as low as 7 microns. Particles finer than about 2 microns are best measured by equipment such as SEDIGRAPH ® 500 analyzer. Particles larger than about 200 microns can be measured by dry screening. The term coarse mineral matter as used herein refers to particles having a size greater than about 10 microns. Generally fluidizable particles are in the 20-200 micron size range and particle size distribution as well as size per se affect fluidizability.

TABLE I

TAR SANDS BITUMEN FEED PROPERTIES

| | |
|---|---|
| °API | 10 |
| Sulfur | 0.4 wt. % |
| Ramsbottom Carbon | 16 wt. % |
| Nickel | 60 wppm. |
| Vanadium | 10 wppm. |
| Ash | ca. 1 wt. % |

TABLE II

CHEMICAL AND PHYSICAL PROPERTIES OF MINERAL MATTER IN TAR SANDS BITUMEN

| Weight Percent | | |
|---|---|---|
| L. O. I. | 25.8 | |
| $CO_2$ (as is) | 22.3 | |
| $SO_4$ (as is) | 5.68 | |
| Volatile Free basis | | |
| $Na_2O$ | 1.12 | |
| $K_2O$ | 1.31 | |
| CaO | 6.75 | |
| $Fe_2O_3$ | 16.7 | |
| $TiO_2$ | 14.1 | |
| $SiO_2$ | 16.3 | |
| $Al_2O_3$ | 5.80 | |
| NiO | — | |
| $V_2O_5$ | 0.13 | |
| $SO_3$ | 6.5 | |
| TOTAL | 99.8 | |
| Particle Size Distribution** | | |
| % 0-20 m | 61 | 77 |
| % 0-40 m | 69 | 86 |
| % 0-60 m | 76 | 91 |
| % 0-80 m | 84 | 91 |
| Average Partile Size m | 9 | 9 |

*Sample similar to but not identical to the one for which the chemical anaylysis was provided.
**Duplicate analyses.

TABLE III

CHEMICAL AND PHYSICAL PROPERTIES EQUILIBRIUM SELECTIVE VAPORIZATION CONTACT MATERIALS

| Chemical Analyses | Bitumen Contact Material | Fresh Contact | Equilibrium Resid Contact Material |
|---|---|---|---|

TABLE III-continued

CHEMICAL AND PHYSICAL PROPERTIES EQUILIBRIUM SELECTIVE VAPORIZATION CONTACT MATERIALS

| (wt. %) | Sample | Material | Sample |
|---|---|---|---|
| LOI | 3.54 | 1.0 | 0.15 |
| $Al_2O_3$ | 44.03 | 45.10 | 44.59 |
| $SiO_2$ | 47.10 | 51.72 | 51.95 |
| $Na_2O$ | 0.51 | 0.45 | 0.91 |
| $Fe_2O_3$ | 1.82 | 0.40 | 1.10 |
| $TiO_2$ | 2.71 | 1.90 | 1.87 |
| $K_2O$ | 0.17 | 0.10 | — |
| CaO | 2.19 | 0.05 | — |
| MgO | 0.52 | 0.03 | — |
| $P_2O_5$ | 0.63 | 0.45 | — |
| Ni (ppm) | 625 | — | 1300 |
| V (ppm) | 1620 | — | 2400 |
| Leco C wt. % (as is) | 0.02 | — | .02 |
| Leco S wt. % (as is) | 1.32 | — | — |
| Mullite Index | 7 | 4 | — |
| BET S. A. ($m^2/g$) | 16.0 | 8.6 | 7.8 |
| $N_2$ Pore Size Dist. 100 A | .02 | .004 | — |
| 100-600 A (cc/g) | .04 | .05 | — |
| Hg Pore Volume (cc/g) (100-20,000 A dia) | 0.20 | 0.25 | 0.17 |
| Particle Size Distribution | | | |

| | Bitumen | Fresh | Crude |
|---|---|---|---|
| Micron Size: | | | |
| 0-20 | 2 | 4 | 1 |
| 0-40 | 3 | 14 | 6 |
| 0-60 | 12 | 37 | 24 |
| 0-80 | 40 | 59 | 47 |
| Avg. Part. Size (micron) | 86 | 71 | 82 |

TABLE IV

MAT RESULTS SELECTIVE VAPORIZATION CONTACT MATERIALS

| MAT Yields (wt. %) | Bitumen Contact Material Sample | Fresh Contact Material | Equilibrium Contact Material Sample |
|---|---|---|---|
| Conversion | 23.19 | 7.0 | 6.1 |
| $H_2$ | 0.13 | 0.06 | 0.12 |
| $C_2$ | 0.56 | 0.50 | 0.69 |
| $C_3 + C_4$ | 2.20 | 0.70 | 1.1 |
| $C_5$-421° F. | 18.38 | 5.0 | 3.0 |
| 421-602° F. | 23.95 | 22.41 | 25.1 |
| 602+ | 52.86 | 70.54 | 68.90 |
| Coke | 2.05 | 0.85 | 1.30 |
| | (Average of 2 runs) | (Average of 2 runs) | (Average of 2 runs) |

TABLE V

EDX ANALYSIS BITUMEN SAMPLE CONTACT MATERIAL

| Oxide Component | Wt. % |
|---|---|
| A. Overall Microsphere Composition: | |
| MgO | 3.24 |
| $Al_2O_3$ | 10.79 |
| $SiO_2$ | 30.31 |
| $P_2O_5$ | 3.41 |
| $SO_3$ | 9.13 |
| CaO | 14.60 |
| $TiO_2$ | 7.76 |
| $V_2O_5$ | 0.46 |
| $Fe_2O_3$ | 9.97 |
| CuO | 0.31 |
| B. Protuberance Composition: | |
| MgO | 2.41 |
| $Al_2O_3$ | 30.42 |
| $SiO_2$ | 39.71 |
| $P_2O_5$ | 1.63 |

TABLE V-continued

EDX ANALYSIS BITUMEN SAMPLE CONTACT MATERIAL

| Oxide Component | Wt. % |
|---|---|
| $SO_3$ | 2.61 |
| $K_2O$ | 0.12 |
| $CaO$ | 3.69 |
| $TiO_2$ | 1.66 |
| $V_2O_5$ | 0.37 |
| $Cr_2O_3$ | 0.38 |
| $MnO$ | 0.19 |
| $Fe_2O_3$ | 16.79 |

TABLE VIII

SURFACE AREA REDUCTION OF BITUMEN EQUILIBRIUM CONTACT MATERIAL

| HgPV | Sample (as rec'd) | A | B | C | D | E | F |
|---|---|---|---|---|---|---|---|
| $N_2$PSD 100 | 0.015 | | | | | | |
| 100–600 | 0.034 | | | | | | |
| S.A. ($m^2/g$) (after acid treatment) | 15.3 | 28.2 | | 39.1 | 40.2 | 38 | 41 |
| S. A. ($m^2/g$) after Calcination | | | | | | | |
| 2 hours. @ 1450 F | — | 19.2 | — | 25.5 | 30.1 | 26.9 | 29.8 |
| @ 1800 F | — | 12.1 | — | 15.3 | 20.7 | 16.2 | 20.7 |

TABLE VI

CHEMICAL TREATMENT OF BITUMEN EQUILIBRIUM CONTACT MATERIAL SAMPLE

| Chemical Analyses (Wt. %) | Sample (as rec'd.) | A<br>35 g solid<br>52.5 g<br>35% $H_2SO_4$ sol.<br>1 hr. reflux | B<br>52.5 ml liq.<br>35 g solid<br>20% $H_2SO_4$<br>1 hr. reflux | C<br>52.5 ml liq.<br>35 g solid<br>20% HCl<br>1 hr. reflux | D<br>125 ml liq.<br>35 g. solid<br>20% HCl, 3 hr. | E<br>125 ml liq.<br>35 g solid<br>20% $H_2SO_4$<br>3 hours | F<br>(20% $H_2SO_4$)<br>1 hour (smpl B)<br>+20% HCl 1 hr. |
|---|---|---|---|---|---|---|---|
| L.O.I. | 4.94 | 3.07 (2.56) | 2.93 | 3.17 (4.22) | 1.78 (2.20) | 3.63 (4.44) | 1.71 (2.00) |
| $Al_2O_3$ | 40.49 | 38.6 | — | 40.15 | 42.65 | 40.03 | 43.43 |
| $SiO_2$ | 42.07 | 44.78 | — | 46.59 | 52.09 | 51.49 | 52.05 |
| $Na_2O$ | 0.81 | 0.54 (0.53) | 0.52 | 0.52 | 0.51 | 0.52 | 0.53 |
| $Fe_2O_3$ | 4.11 | 0.64 (0.61) | 1.13 | 4.37 | 0.96 | 0.74 | 0.67 |
| $TiO_2$ | 4.02 | 4.34 (3.73) | 2.89 | 5.13 | 2.87 | 3.01 | 2.91 |
| $K_2O$ | 0.65 | 0.32 | 0.32 | 0.31 | 0.36 | 0.33 | 0.36 |
| CaO | 5.11 | 5.20 | 2.75 | 1.77 | 0.19 | 2.14 | 0.22 |
| MgO | 1.05 | 0.12 | 0.16 | 0.49 | 0.12 | 0.12 | 0.2 |
| $P_2O_5$ | 1.05 | 0.26 | — | — | — | 0.27 | 0.26 |
| Ni (ppm) | 700 | 290 (408) | — | 651 | 321 | 298 | 297 |
| V (ppm) | 1000 | 440* | — | 752 | 495 | 447 | 469 |
| Leco S | 1.61 | 2.96 | — | — | — | 1.33 | 0.05 |
| Leco C | 0.05 | 0.05 | — | — | — | 0.02 | 0.14 |
| % $Al_2O_3$ Leached from sample calculated from chemical analysis of leach solutions | — | 11.4 | 5.2 | 4.1 | 7.7 | 11.1 | 11.9 |

*Probable error in analysis.

TABLE VII

CATALYTIC ACTIVITY OF LEACHED BUT UNCALCINED BITUMEN CONTACT MATERIAL SAMPLE

| | Sample (as rec'd) | A | B | C | D | E | F |
|---|---|---|---|---|---|---|---|
| HgPV | | | | | | | |
| $N_2$PSD 100 | 0.015 | | | | | | |
| 100–600 | 0.034 | | | | | | |
| S.A. (after acid treatment) | 15.3 | 28.2 | | 39.1 | 40.2 | 38 | 41 |
| MAT | | | | | | | |
| Conversion | 7.43 | 8.77 | | 25.96 | 20.70 | 12.70 | 13.97 |
| Hydrogen | 0.03 | 0.08 | | 0.20 | 0.11 | 0.09 | 0.09 |
| $C_2-$ | 0.27 | 0.43 | | 0.58 | 0.46 | 0.46 | 0.45 |
| $C_3 + C_4$ | 0.58 | 0.65 | | 2.05 | 1.89 | 0.99 | 1.08 |
| $C_5 - 421$ | 4.88 | 6.05 | | 19.91 | 16.03 | 8.85 | 10.38 |
| 421–602 | 21.51 | 23.49 | | 25.23 | 24.73 | 23.97 | 24.61 |
| 602+ | 71.06 | 67.73 | | 48.80 | 54.57 | 63.33 | 61.42 |
| Coke | 1.69 | 1.64 | | 3.43 | 2.33 | 2.40 | 2.06 |
| Leco C | 0.31 | 0.30 | | 0.63 | 0.43 | 0.45 | 0.38 |

TABLE IX

CHEMICAL AND PHYSICAL PROPERTIES OF DISCARDED "SAND" FROM BITUMEN TAR SAND CONCENTRATION

| | |
|---|---|
| L. O. I. (wt. %) | 2.69 |
| Leco C, (wt %) | 0.69 |
| Leco S, (wt %) | 0.34 |
| Volatile Free Basis (wt. %) | |
| $Na_2O$ | 2.29 |
| $K_2O$ | 3.45 |
| CaO | 1.13 |
| MgO | 0.43 |
| $Fe_2O_3$ | 0.89 |
| $TiO_2$ | <0.13 |
| $SiO_2$ | 81.7 |
| $Al_2O_3$ | 8.92 |
| Total | 98.8 |
| Mean Particle Size (microns) (dry screen analysis) | 181.8 |

TABLE X

Physical Properties of ASP 600 and Coarse Dixie Microspheres

| Exp. No. | Description of Clay Employed to Make Microspheres | Calcined Temperature °C. | Bulk Density g/cc | Total Pore Volume cc/g** | Surface Area $m^2/g$ | EAI %/sec. | Mullite Index | Cristobalite d = 4.11A Peak Height* | Peak Width* |
|---|---|---|---|---|---|---|---|---|---|
| 238 | ASP 600 | 1149 | 1.17 | 0.239 | 7.5 | 0.62 | 16 | | |
| 239 | | 1204 | 1.26 | 0.188 | 5.5 | 0.42 | 37 | | |
| 240 | | 1260 | 1.38 | 0.134 | 2.9 | 0.22 | 52 | | |
| 241 | | 1316 | 1.43 | 0.081 | 1.6 | 0.25 | 53 | | |
| 242 | | 1371 | 1.45 | 0.037 | 1.0 | 0.20 | 58 | | |
| 254 | ASP 600 | 1149 | 1.14 | 0.248 | 8.8 | 1.00 | 7 | None | — |

TABLE X-continued

Physical Properties of ASP 600 and Coarse Dixie Microspheres

| Exp. No. | Description of Clay Employed to Make Microspheres | Calcined Temperature °C. | Bulk Density g/cc | Total Pore Volume cc/g** | Surface Area m²/g | EAI %/sec. | Mullite Index | Cristobalite d = 4.11A Peak Height* | Peak Width* |
|---|---|---|---|---|---|---|---|---|---|
| | (Repeat runs) | | | | | | | Found | |
| 255 | | 1204 | 1.21 | 0.210 | 6.9 | 0.67 | 26 | 37 | .30 |
| 256 | | 1260 | 1.32 | 0.150 | 3.9 | 0.37 | 49 | 303 | .34 |
| 257 | | 1316 | 1.42 | 0.094 | 1.8 | 0.29 | 52 | 1024 | .34 |
| 258 | | 1371 | 1.49 | 0.046 | 1.2 | 0.19 | 59 | 1414 | .30 |
| 245 | Coarse Dixie | 1149 | 1.21 | 0.204 | 7.4 | 0.74 | 14 | 14 | — |
| 246 | (−325 mesh) | 1260 | 1.40 | 0.082 | 0.5 | 1.10 | 50 | 734 | — |
| 247 | | 1371 | 1.45 | 0.017 | 0.7 | 0.59 | 54 | 894 | — |
| 248 | Coarse Dixie (78% minus 2 microns cut) | 1093 | 1.10 | 0.259 | 12.5 | 1.20 | 4 | None Found | — |
| 249 | | 1149 | 1.18 | 0.212 | 8.8 | 1.00 | 13 | 25 | .62 |
| 250 | | 1204 | 1.29 | 0.151 | 5.7 | 0.47 | 29 | 59 | .46 |
| 251 | | 1260 | 1.45 | 0.057 | 0.7 | 0.60 | 53 | 751 | .28 |
| 252 | | 1316 | 1.46 | 0.024 | 0.5 | 0.93 | 54 | 1129 | .28 |
| 253 | | 1371 | 1.49 | 0.022 | 1.5 | 0.41 | 54 | 1142 | .26 |

*Peak Height is a qualitative measure of component concentration. Peak width is a qualitative measure of degree of crystallinity.
**Determined by Hg porosimetry (volume in pores having diameters between 100 and 20,000 Angstrom units).

TABLE XI

Properties of Calcined Dixie (Hard) Clay Microspheres Before and After Reactivation with $H_2SO_4$

| | Calcination Temperature (°C.) | After Calcination | | | | After Impregnation and Reactivation with 35% $H_2SO_4$ | | | |
|---|---|---|---|---|---|---|---|---|---|
| | | Surface Area (m²/g) | Hg PV (cc/g) | EAI (%/sec.) | Mullite Index | Surface Area (m²/g) | Hg PV (cc/g) | EAI (%/sec.) | Mullite Index |
| Smpl. No. 249 | 1149 | 8.8 | 0.21 | 1.0 | 13 | 17.3 | 0.25 | 0.64 | 39 |
| Smpl. No. 250 | 1204 | 5.7 | 0.15 | 0.47 | 29 | 13.5 | 0.20 | 0.51 | 42 |
| Smpl. No. 251 | 1260 | 0.7 | 0.06 | 0.60 | 53 | 12.7 | 0.06 | 0.29 | 53 |
| Smpl. No. 252 | 1316 | 0.5 | 0.02 | 0.93 | 54 | 11.0 | 0.06 | 0.36 | 56 |
| Smpl. No. 253 | 1371 | 1.5 | 0.02 | 0.41 | 54 | 9.2 | 0.05 | 1.28 | 57 |

TABLE XII

Properties of Calcined ASP 600 Microspheres Before and After Reactivation with $H_2SO_4$

| | Calcination Temperature (°C.) | After Calcination | | | | After Impregnation and Reactivation with 35% $H_2SO_4$ | | | |
|---|---|---|---|---|---|---|---|---|---|
| | | Surface Area (m²/g) | Hg PV (cc/g) | EAI (%/sec.) | Mullite Index | Surface Area (m²/g) | Hg PV (cc/g) | EAI (%/sec.) | Mullite Index |
| Smpl. No. 238 | 1149 | 7.5 | 0.24 | 0.62 | 16 | 19.6 | 0.23 | 0.57 | 34 |
| Smpl. No. 239 | 1204 | 5.5 | 0.19 | 0.42 | 37 | 17.1 | 0.18 | 0.51 | 46 |
| Smpl. No. 240 | 1260 | 2.9 | 0.13 | 0.22 | 52 | 12.3 | 0.11 | 0.24 | 42 |
| Smpl. No. 241 | 1316 | 1.6 | 0.08 | 0.25 | 53 | 10.3 | 0.07 | 0.20 | 57 |
| Smpl. No. 242 | 1371 | 1.0 | 0.04 | 0.20 | 58 | 7.8 | 0.03 | 0.18 | 58 |

TABLE XIII

Extraction of V, Ni and $Al_2O_3$ by 35% $H_2SO_4$ from Microspheres Made from Dixie Clay

| Sample No. | Calcination Temperature (°C.) | Initial Metals (%) V | Ni | Final Metals (%) V | Ni | % Extraction V | Ni | $Al_2O_3^b$ |
|---|---|---|---|---|---|---|---|---|
| 249 | 1149 | 2.25 | 0.57 | 1.17 | 0.35 | 50.6 | 41.7 | 6.1 |
| 250 | 1204 | 2.30 | 0.60 | 1.03 | 0.26 | 57.6 | 50.9 | 4.6 |
| 251 | 1260 | 2.25 | 0.61 | 0.50 | 0.07 | 79.0 | 79.2 | 3.0 |
| 252 | 1316 | 2.29 | 0.63 | 0.46 | 0.05 | 81.2 | 92.6 | 2.5 |
| 253 | 1371 | 2.45 | 0.62 | 0.44 | 0.06 | 83.2 | 90.9 | 1.9 |

$^b$Based on contained $Al_2O_3$ in metals free microsphere

TABLE XIV

Extraction of V, Ni and $Al_2O_3$ by 35% $H_2SO_4$ from Calcined ASP-600 Microspheres

| Sample No. | Calcination Temperature (°C.) | Initial Metals (%) V | Ni | Final Metals (%) V | Ni | % Extraction V | Ni | $Al_2O_3^b$ |
|---|---|---|---|---|---|---|---|---|
| 238 | 1149 | 2.34 | 0.57 | 1.07 | 0.27 | 56 | 53 | 8.2 |
| 239 | 1204 | 2.22 | 0.60 | 0.81 | 0.16 | 64 | 71 | 6.5 |
| 240 | 1260 | 2.23 | 0.66 | 0.55 | 0.07 | 71 | 82 | 1.9 |
| 241 | 1316 | 2.13 | 0.64 | 0.40 | 0.05 | 81 | 85 | 1.3 |
| 242 | 1371 | 1.93 | 0.58 | 0.31 | 0.05 | 85 | 95 | 1.0 |
| Control A - 5% mullite | | 1.59 | 0.42 | 0.61 | 0.35 | 63 | 21 | 5.5 |

TABLE XIV-continued

Extraction of V, Ni and Al$_2$O$_3$ by 35% H$_2$SO$_4$ from Calcined ASP-600 Microspheres

| Sample No. | Calcination Temperature (°C.) | Initial Metals (%) V | Ni | Final Metals (%) V | Ni | % Extraction V | Ni | Al$_2$O$_3$[b] |
|---|---|---|---|---|---|---|---|---|
| Control B - 39% mullite | | 2.32 | 0.61 | 0.50 | 0.17 | 80 | 75 | 4.9 |

[b]Based on contained Al$_2$O$_3$ in metals free microspheres.

TABLE XV

Physical and Performance Properties of Microspheres of Calcined ASP 600 Clay vs. Calcination Temperature

| Experiment Numbers | Calcination Temperature °C. | Bulk Density g/cc | Mullite Index | Pore Volume cc/g | EAI %/sec. | Performance Agglomeration Test Mean, micron | % Leachability of Ni and V |
|---|---|---|---|---|---|---|---|
| 238 | 1149 | 1.17 | 16 | 0.239 | 0.62 | 109 | 70% or below |
| 239 | 1204 | 1.26 | 37 | 0.188 | 0.42 | 99 | |
| 240 | 1260 | 1.38 | 52 | 0.134 | 0.22 | 43 | |
| 241 | 1316 | 1.43 | 53 | 0.081 | 0.25 | 1.2 | 85% + |
| 242 | 1371 | 1.45 | 58 | 0.037 | 0.20 | 0 | |
| Sample A (Control) | | 1.07 | 5 | 0.26 | 1.0 | * | 55 |
| Sample B (Control) | | 1.18 | 39 | 0.16 | 0.21 | * | 80 |

*Not determined at 8% metals.

TABLE XVI

Contact Material Prepared from Mixtures of Clay and Alumina

Physical Properties Fresh Material

| No. | Sample Description Parts by wt Al2O3/ Parts by wt Clay | Calc °C. | B.D. g/cc | P.V. cc/g | S.A. m2/g | EAI %/sec | Mullite Index | Catalytic (MAT) Results H2 | Conv. | Coke |
|---|---|---|---|---|---|---|---|---|---|---|
| 200 | 14.2 Alcoa A-3/85.8 ASP 600 | 1371 | 1.55 | .095 | 1.9 | 0.11 | 59 | 0 | 2.75 | 0.33 |
| 213 | | 1260 | 1.40 | .156 | 4.2 | 0.30 | 42 | 0.01 | 3.84 | 0.55 |
| 201 | 30.0 Alcoa A-3/69.7 ASP 600 | 1371 | 1.31 | .195 | 3.5 | 0.34 | 52 | 0 | 2.90 | 0.49 |
| 214 | | 1260 | 1.22 | .251 | 5.6 | 0.45 | 32 | 0.02 | 4.02 | 0.66 |
| 202 | 46.6 Alcoa A-3/53.4 ASP 600 | 1371 | 1.25 | .246 | 4.0 | 0.42 | 43 | 0 | 3.37 | 0.55 |
| 215 | | 1260 | 1.15 | .304 | 6.3 | 0.67 | 25 | 0.02 | 4.70 | 0.82 |
| 203 | 72.3 Alcoa A-3/27.7 ASP 600 | 1371 | 1.17 | .325 | 4.9 | 0.92 | 21 | | | |
| 216 | | 1260 | 1.09 | .373 | 7.2 | 1.2 | 10 | 0.02 | 4.55 | 0.76 |
| 204 | 14.2 Alcoa A-3/85.8 Hard | 1371 | 1.50 | .071 | 1.1 | 0.14 | 59 | 0 | 1.96 | 0.27 |
| 217 | Clay | 1260 | 1.36 | .148 | 2.6 | 0.34 | 45 | 0.01 | 3.01 | 0.50 |
| 205 | 30.3 Alcoa A-3/69.7 Hard | 1371 | 1.39 | .159 | 2.4 | 0.34 | 51 | 0 | 2.41 | 0.38 |
| 218 | Clay | 1260 | 1.28 | .213 | 3.9 | 0.34 | 35 | 0 | 2.96 | 0.71 |
| 206 | 46.6 Alcoa A-3/53.4 Hard | 1371 | 1.29 | .243 | 3.5 | 0.43 | 38 | 0 | 3.10 | 0.60 |
| 219 | Clay | 1260 | 1.18 | .292 | 5.5 | 0.51 | 24 | 0.02 | 4.27 | 0.77 |
| 207 | 72.3 Alcoa A-3/27.7 Hard | 1371 | 1.18 | .312 | 4.0 | 0.85 | 13 | | | |
| 220 | Clay | 1260 | 1.09 | .372 | 6.2 | 1.3 | 8 | 0.02 | 5.26 | 0.76 |
| 208 | 30.3 Ball A-3/69.7 ASP 600 | 1371 | 1.33 | .200 | 3.1 | 0.25 | 53 | 0 | 2.87 | 0.44 |
| 221 | Milled | 1260 | 1.22 | .255 | 4.7 | 0.39 | 36 | 0.01 | 3.95 | 0.70 |
| 209 | 46.6 Ball A-3/53.4 ASP 600 | 1371 | 1.22 | .274 | 4.1 | 0.38 | 42 | 0.01 | 4.69 | 0.65 |
| 222 | Milled | 1260 | 1.14 | .309 | 5.8 | 0.67 | 25 | 0.01 | 4.06 | 0.76 |
| 210 | ASP 600 (Control) | 1371 | 1.51 | .047 | 0.7 | 0.27 | 58 | 0 | 2.43 | 0.16 |
| 223 | | 1260 | 1.40 | .139 | 3.3 | 0.35 | 46 | 0.01 | 3.05 | 0.54 |
| 211 | 46.6 Reynolds FGA/53.4 | 1371 | 1.47 | .139 | 1.4 | 0.33 | 42 | 0 | 3.06 | 0.32 |
| 224 | (ASP 600) | 1260 | 1.08 | .338 | 11.3 | 0.94 | 28 | 0.04 | 6.06 | 1.09 |
| 212 | 46.6 Reynolds TGA/53.4 | 1371 | 1.46 | .146 | 1.6 | 0.47 | 39 | 0 | 2.36 | 0.33 |
| 225 | (ASP 600) | 1260 | 1.07 | .347 | 12.3 | 1.0 | 23 | 0.04 | 6.74 | 1.20 |

Performance Properties with 8% metals

| No. | Metals Extraction 17% HCL L/S - 3/1 V | Ni | V + Ni | Al2O3 | Metals Extraction 35% H2SO4 L/S = 5/1 V | Ni | V + Ni | Al2O3 | Agglomeration |
|---|---|---|---|---|---|---|---|---|---|
| 200 | 95 | 98 | 96 | 2.4 | 85 | 98 | 87 | 2.8* | 5 |
| 213 | 92 | 96 | 93 | 4.6 | 86 | 96 | 88 | 6.0 | 46 |
| 201 | 95 | 98 | 96 | 2.1 | 95 | 75 | 91 | 2.4 | 61 |
| 214 | 93 | 96 | 94 | 3.1 | 93 | 96 | 94 | 3.7 | 80 |
| 202 | 89 | 97 | 92 | 1.3 | 76 | 97 | 80 | 1.5* | 28 |
| 215 | 94 | 95 | 94 | 0.8 | 94 | 94 | 94 | 2.1 | 27 |
| 203 | 96 | 97 | 96 | 0.6 | 72 | 97 | 77 | 0.6* | 24 |
| 216 | 95 | 96 | 95 | 0.6 | 95 | 95 | 95 | 0.6 | 7 |
| 204 | 95 | 98 | 95 | 2.8 | 92 | 98 | 93 | 3.5 | 21 |
| 217 | 91 | 97 | 92 | 3.0 | 92 | 97 | 92 | 3.9 | 63 |
| 205 | 92 | 98 | 93 | 2.1 | 79 | 97 | 83 | 2.5* | 22 |
| 218 | 92 | 97 | 93 | 2.7 | 92 | 97 | 93 | 3.2 | 42 |
| 206 | 94 | 96 | 94 | 1.4 | 75 | 95 | 79 | 1.5* | 12 |
| 219 | 93 | 95 | 93 | 1.2 | 93 | 95 | 93 | 1.6 | 28 |
| 207 | 96 | 97 | 96 | 0.6 | 95 | 94 | 95 | 0.6 | 28 |
| 220 | 95 | 95 | 95 | 0.6 | 96 | 96 | 96 | 0.6 | 13 |
| 208 | 97 | 98 | 97 | 2.0 | 97 | 98 | 97 | 2.5 | 79 |

TABLE XVI-continued

Contact Material Prepared from Mixtures of Clay and Alumina

| 221 | 92 | 92 | 92 | 2.5 | 92 | 96 | 93 | 3.0 | 112 |
|---|---|---|---|---|---|---|---|---|---|
| 209 | 97 | 98 | 97 | 1.4 | 90 | 97 | 91 | 1.7 | 88 |
| 222 | 93 | 95 | 93 | 1.8 | 94 | 95 | 94 | 2.1 | 56 |
| 210 | 95 | 98 | 96 | 3.4 | 94 | 98 | 94 | 4.1 | 1 |
| 223 | 94 | 97 | 95 | 3.2 | 95 | 97 | 96 | 3.8 | 14 |
| 211 | 94 | 98 | 95 | 1.9 | 94 | 97 | 95 | 2.2 | 27 |
| 224 | 90 | 90 | 90 | 3.1 | 91 | 87 | 90 | 4.1 | 96 |
| 212 | 95 | 97 | 95 | 2.0 | 93 | 97 | 94 | 2.3 | 26 |
| 225 | 90 | 87 | 89 | 3.4 | 91 | 87 | 90 | 4.8 | 85 |

*L/S - 3/1 for this $H_2SO_4$ extraction
*35% $H_2SO_4$ L/S = 3

We claim:

1. A process for upgrading a charge of a tar sand bitumen concentrate containing mineral matter including fine particles which comprises contacting said charge in a riser in the presence of a low boiling organic solvent diluent with finely divided attrition-resistant particles of a hot fluidizable substantially catalytically inert solid which is substantially chemically inert to a solution of mineral acid, the contact of said charge with said particles being at high temperature and short contact time to vaporize the high hydrogen containing components of said bitumen, said period of time being less than that which induces substantial thermal cracking of said charge, at the end of said time separating said vaporizing product from said fluidizable particles, said fluidizable particles now bearing a deposit of both combustible solid, adherent particles of fine particles of mineral matter and metals, and passing said particles of inert solid with deposit of combustibles and fine particles of mineral matter to a regenerator to oxidize the combustible portion of said deposits, removing at least a portion of deposit of mineral matter and metals by removing said inert solid from said regenerator and contacting removed inert solid with a hot mineral acid, and recirculating fluidizable solid depleted at least in part of deposited mineral matter to contact with incoming charge of tar sand bitumen concentrate and diluent.

2. The process of claim 1 wherein said acid is sulfuric, hydrochloric or nitric and the fine mineral matter that is removed by extraction with said mineral acid contains calcium, magnesium, titanium, and iron.

3. The process of claim 1 wherein said inert solid comprises calcined clay or calcined kyanite and the fine mineral matter that is extracted with said mineral acid contains calcium, magnesium, titanium, and iron.

4. The process of claim 2 wherein said bitumen concentrate contains from 2500 ppm to 20 percent fine mineral matter, based on the weight of said bitumen, calculated on a dry weight basis.

5. The process of claim 4 wherein said bitumen concentrate also contains water.

6. The process of claim 5 wherein said fine particles of mineral matter are present as an emulsion in said bitumen concentrate.

7. The process of claim 1 wherein said regenerator is provided with cyclones and high velocity air jets to attrite deposited mineral matter from said attrition-resistant microspheres, and recovering material removed by attrition from the regenerator.

8. The process of claim 1 wherein the mineral matter also includes coarse particles comprising quartz or diatomite.

9. The process of claim 1 wherein said vaporized product is further refined to produced one or more premium products such as gasoline.

10. The process of claim 1 wherein spent fluidizable inert contact material is withdrawn n a continuous or semi-continuous basis in order to maintain a predetermined average metal content in the circulating contact material and to prevent, in conjunction with said acid removal of mineral matter, the buildup of high levels of metals of a deposit on said particles of contact material.

11. The process of claim 1 wherein said tar sand bitumen concentrate is prepared by wet processing such as floatation or gravity separation.

12. The process of claim 11 wherein wet processed tar sand bitumen is further processed by solvent extraction to recover a bitumen concentrate.

13. The process of claim 11 wherein said charge is diluted with at least a portion of the solvent used in the purification to obtain said concentrate, whereby the amount of solvent that is removed by fractionation from said concentrate prior to contact with said heated fluidizable solid is reduced or eliminated.

14. The process of claim 1 wherein said charge is diluted with light gas oil and/or gas recovered from the vaporized product obtained by contact of a previous charge of tar sand bitumen concentrate with hot fluidizable inert solid.

15. The process of claim 1 wherein said substantially catalytically inert solid is in the form of microspheres comprising mullite and crystalline silica and wherein substantially all of the silica is present in mullite and crystalline silica and substantially all of the alumina is present in mullite or mullite and acid insoluble alumina.

16. The process of claim 15 wherein said fluidizable microspheres analyze at least 95% by weight combined $SiO_2/Al_2O_3$ and consist essentially of mullite crystals and crystalline silica, said microspheres having a mullite index of at least 45, an EAI below 1%/sec., a surface area below 5 m$^2$/g, a total porosity in the range of 0.01 to .09 cc/g and a pore structure such that the majority of the pores are larger than 1000 Angstrom units in diameter.

17. The process of claim 15 further characterized in that said microspheres have a resistance to agglomeration below about 25 when tested by the static agglomeration test method hereinabove described at a metals loading of 8 weight % nickel plus vanadium, and a vanadium/nickel weight ratio of 4/1.

18. The process of claim 1 wherein said particles of contact material comprise mullite and crystalline silica and wherein substantially all of the silica is present in mullite and crystalline silica, and, at least periodically a portion of said particles are withdrawn from said regenerator and contacted with an aqueous solution of sulfuric acid, hydrochloric acid or nitric acid to extract nickel and vanadium and fine mineral matter therefrom without substantial coextraction of alumina from said particles and without appreciably changing the size and hardness thereof, and reintroducing at least a part of the solid particles thus extracted into said burning zone for subsequent reintroduction to said decarbonizing and demetallizing zone.

19. The process of claim 18 wherein said particles are in the form of fluidizable spray dried microspheres the EAI of which is below 0.5%/sec. before and after extraction of clay deposit.

20. The process of claim 1 wherein said nickel and vanadium are also extracted with said solution of mineral acid without previously being subjected to any pretreatment to facilitate extraction of nickel or vanadium with mineral acid other than burning in air to remove residual carbon and to oxidize vanadium to the pentavalent valence state.

21. A process for upgrading a charge of a tar sand bitumen concentrate containing fine mineral particles and water which comprises contacting said charge in a riser in the presence of a low boiling organic solvent diluent with finely divided attrition-resistant particles of a hot fluidizable substantially catalytically inert solid consisting essentially of crystalline mullite and crystalline silica, said contact being carried out at a high temperature and short contact time to vaporize the high hydrogen containing components of said bitumen, said period of time being less than that which induces substantial thermal cracking of said charge, at the end of said time separating said vaporized product from said fluidizable particles, said fluidizable particles now bearing a deposit of both combustible solid, metals and adherent particles of fine mineral particles, reducing the temperature of said vaporized product to minimize thermal cracking and recovering said product for further refining to produce one or more premium products, passing said particles of inert solid with deposit of combustibles, metals and fine mineral particles to a regenerator to oxidize the combustible portion of the deposits, at least periodically withdrawing an additional portion of said particles from said regenerator and contacting them in an extraction zone with a solution of mineral acid selected from the group consisting of sulfuric, nitric and hydrochloric at elevated temperature to remove deposited mineral matter and metals from the tar sand bitumen without substantial coextraction of alumina from said attrition-resistant particles and without appreciably changing the size and hardness thereof, and reintroducing at least a part of the solid particles thus extracted from said extraction zone into said regenerator for recycle to said decarbonizing and demetallizing zone.

22. The process of claim 21 wherein said nickel and vanadium are also extracted in said extraction zone with said solution of mineral acid without previously subjecting said particles withdrawn from the regenerator to any pretreatment to facilitate extraction of nickel or vanadium with mineral acid other than burning in air to remove residual carbon and to oxidize vanadium to the pentavalent valence state.

23. The process of claim 21 wherein said finely divided attrition-resistant particles consisting essentially of crystalline mullite and crystalline silica are obtained by calcining particles of kaolin clay.

24. The process of claim 21 wherein said finely divided attrition-resistant particles consisting essentially of crystalline mullite and crystalline silica are obtained by calcining particles of kyanite.

25. The process of claim 21 wherein said finely divided attrition-resistant particles consisting essentially of crystalline mullite and crystalline silica also contain acid-insoluble alumina.

* * * * *